United States Patent [19]

Kishi

[11] 4,050,087
[45] Sept. 20, 1977

[54] CASSETTE TAPE RECORDING AND/OR REPRODUCING APPARATUS

[75] Inventor: Yoshio Kishi, Tokyo, Japan

[73] Assignee: Sony Corporation, Tokyo, Japan

[21] Appl. No.: 712,770

[22] Filed: Aug. 9, 1976

[30] Foreign Application Priority Data

Aug. 13, 1975 Japan .................................. 50-98289

[51] Int. Cl.² ............................................. G11B 23/06
[52] U.S. Cl. ....................................... 360/96; 360/95; 360/132; 242/198
[58] Field of Search ..................... 360/96, 95, 132, 85; 242/198, 199

[56] References Cited

U.S. PATENT DOCUMENTS

| 3,759,465 | 9/1973 | Janssen et al. | 360/95 X |
| 3,900,170 | 8/1975 | Serizawa | 360/96 X |
| 3,900,171 | 8/1975 | Serizawa | 360/96 X |
| 3,900,172 | 8/1975 | Kamaya | 242/198 |

Primary Examiner—John H. Wolff
Attorney, Agent, or Firm—Lewis H. Eslinger; Alvin Sinderbrand

[57] ABSTRACT

In a tape recording and/or reproducing apparatus for use with a tape cassette containing a supply of tape and having an opening at one side of the cassette housing along which a run of the tape is normally guided, and lids mounted on the housing for movement between closed positions for covering respective parts of the tape run and opened positions where the lids are displaced from the opening to permit the withdrawal of the tape therethrough: magnetic heads or transducers are mounted on a chassis so as to be spaced from the open side of a cassette housing when the latter is operatively positioned in respect to the chassis; tape withdrawing members are engageable with the tape run in the operatively positioned cassette housing and are operative to withdraw the tape through the open side and into engagement with the transducers; and a cassette loading device includes a cassette holder movable between an inoperative position for the insertion and removal of a cassette in the holder and an operative position where a cassette in the holder is operatively positioned, and lid opening members mechanically coupled with the holder to move between inactive positions avoiding interference with insertion and removal of a cassette in the holder in its inoperative position, and active positions in which the lid opening members open the lids of an operatively positioned cassette in response to movement of the holder to its operative position.

16 Claims, 16 Drawing Figures

CASSETTE TAPE RECORDING AND/OR REPRODUCING APPARATUS

BACKGROUND OF THE INVENTION

1. Field of the Invention

This invention relates generally to cassette tape recording and/or reproducing apparatus, and more particularly is directed to a cassette loading device for a tape recording and/or reproducing apparatus of the type in which the tape is withdrawn from a cassette housing for recording and reproducing information signals on the tape.

2. Description of the Prior Art

The conventional tape cassette for the recording and/or reproducing of audio signals is provided with a plurality of openings at one side of the cassette housing through which a magnetic recording and/or reproducing head, a pinch roller, capstan and the like may be inserted into the cassette housing to record and/or reproduce signals on the tape while the latter is driven or transported in a predetermined direction. However, in such a tape cassette, the number and size of the openings that may be formed in the cassette housing are limited and this, in turn, limits the number and size of the magnetic heads that may be employed for recording and reproducing operations. Accordingly, in existing tape recording and/or reproducing apparatus intended for use with tape cassettes of the described type, that is, in which the tape remains wholly within the cassette housing during recording and reproducing operations, the magnetic head used for reproducing signals recorded on the tape is also used, in asociation with an erasing head, for recording new signals on the tape. It is known that the use of the same magnetic head for both recording and reproducing operations limits the quality of the audio or other information signals that may be recorded and reproduced thereby. Further, when the magnetic recording and/or reproducing head is inserted into the cassette housing for engagement with the tape therein, as aforesaid, it is difficult to ensure the precise positioning of the tape relative to such head, and variations of the position or path of the tape relative to the recording and/or reproducing head also deleteriously affect the quality of the recorded and reproduced signals.

Therefore, when it is desired to obtain high quality recording and reproducing of audio or other information signals, it has been the usual practice to employ apparatus of the so-called open-reel type having separate or individual heads for respectively recording and reproducing signals on the tape which is precisely guided relative to such heads in the run of the tape between the supply and take-up reels. However, apparatus of the open-reel type has the well-known disadvantages of requiring the manual threading of the leader or end portion of the tape from the supply reel past the guide pins an heads, and between each capstan and associated pinch roller to the takeup reel when installing a tape on the apparatus, and of requiring rewinding of the entire tape onto the supply reel when one tape is to be exchanged for another.

In order to avoid the above described disadvantages of recording and reproducing apparatus of the open-reel type and the limitations on the quality of recording and reproducing previously attainable with cassette type recording and reproducing apparatus, it has been proposed, for example, as disclosed in United Kingdom Patent Specification No. 1,121,125, published July 24, 1968, to provide a cassette from which the tape is withdrawn when signals are to be recorded or reproduced thereon by means of respective magnetic heads which are disposed outside of the cassette housing. However, in cassettes intended for use with such apparatus, a run of the tape is exposed at the exterior of the cassette housing even when the cassette is not in use, so that the exposed tape is susceptible to being damaged or even severed and will collect dust thereon.

The exposure of the tape when the cassette is not in use may be avoided by the cassette arrangement disclosed in U. S. Pat. No. 3,900,171, issued Aug. 19, 1975, and having a common assignee herewith. In such cassette, the housing has spaced parallel walls with an opening therebetween extending along one side of the housing, and a lid is provided which is normally spring-biased and locked in a closed position to cover the tape extending along such open side of the cassette housing when the cassette is not in use so as to protect the tape from damage thereto. However, in this previously proposed tape cassette, the lid is pivotally mounted for movement in respect to the housing about an axis which extends along the open side of the housing and is parallel to the planes of the spaced walls thereof. Therefore, in moving about such axis from its closed position to an opened position, the lid has to be moved across the plane of one of the spaced parallel walls of the cassette housing, for example, the wall which is at the top of the cassette housing in the normal operating position of the latter. In other words, the lid has to be moved in the upward direction from its closed position to its opened position when the cassette is in its normal operating position. Thus, if a recording and/or reproducing apparatus for use with a tape cassette of the described type is provided with a suitable mechanism for effecting the upward opening movement of the lid prior to the withdrawing of the tape from the cassette housing for a recording or reproducing operation, the cassette can be used only in one orientation in which the lid opens upwardly, that is, the cassette cannot be inverted for a recording or reproducing operation as the lid would open downwardly and could not be actuated by the existing lid opening mechanism. Thus, the described tape cassette cannot be used for recording and/or reproducing operations of the type in which, for example, one or more tracks on the tape are used for recording or reproducing information signals with the cassette in one orientation, and the cassette is inverted for permitting recording or reproducing of information signals in one or more other tracks on the tape.

In order to avoid the above described disadvantages of the tape cassette having its lid swingable from a closed position to an opened position about an axis extending along the open side of the cassette housing, it has been proposed, for example, as disclosed in U.S. patent application Ser. No. 636,829, filed Dec. 2, 1975, and having a common assignee herewith, to provide a tape cassette with a housing having spaced parallel walls with an opening therebetween at one side of the housing along which a run of the tape is normally guided, and the lids mounted for pivoting relative to the housing about respective axes which are perpendicular to the spaced parallel walls adjacent the opposite ends of the open side of the housing, so that the lids are movable relative to the housing in directions parallel to the planes of the spaced walls thereof between closed positions where the lids extend along the open side for covering respective parts of the tape run and opened positions where the lids are displaced from the opening to permit the withdrawal of the tape therethrough. By reason of such movable mounting of the lids, the same lid opening mechanism can be employed for opening the lids when the cassette is operatively positioned in either one of two relatively inverted orientations. However, in the existing tape recording and/or reproducing apparatus for use with a tape cassette of the last described type, either a separate lid opening mechanism is provided for opening the lids after the cassette has been brought to its operative position by a movable cassette holder, or the lid opening mechanism is combined with the tape withdrawing means by which the tape is withdrawn from the cassette housing and moved into engagement with the recording and/or reproducing heads and the tape drive capstan which are spaced from the operatively positioned cassette. If a separate lid opening mechanism is provided, as aforesaid, the structure and operation of the recording and/or reproducing apparatus are made undesirably complex. On the other hand, if the lid opening mechanism is combined with the tape withdrawing means, then the lids remain in their closed positions during fast-forward and rewind operations of the recording and/or reproducing apparatus so that the lids may come into contact with and mar the tape while the latter is being moved at high speed during such operations.

OBJECTS AND SUMMARY OF THE INVENTION

Accordingly, it is an object of the invention to provide a tape recording and/or reproducing apparatus for use with a tape cassette of the last described type, and in which the above-mentioned disadvantages of the previously existing or proposed apparatus are avoided.

More specifically, it is an object of this invention to provide a cassette loading device in a tape recording and/or reproducing apparatus for use with a tape cassette of the last described type, and in which the lids of the tape cassette are automatically opened upon movement of the cassette to its operative position.

In accordance with an aspect of this invention, in a tape recording and/or reproducing apparatus for use with a tape cassette including a housing containing a supply of tape and having spaced parallel walls with an opening therebetween at one side of the housing along which a run of the tape is normally guided, and lids mounted on the housing for movement relative to the latter in directions parallel to the planes of the spaced walls between closed positions where the lids extend along the opening for covering respective parts of the tape run and opened positions where the lids are displaced from the opening to permit the withdrawal of the tape therethrough; magnetic heads or transducers for recording and/or reproducing information signals on a tape engaged therewith are mounted on a chassis so as to be spaced from the open side of a cassette housing when the latter is operatively positioned by engagement with locating members on the chassis; tape withdrawing members are engageable with the tape run in the cassette housing operatively positioned by the locating members and are operative to withdraw the tape through the open side of the cassette housing into engagement with the transducers; and a cassette loading device is provided which includes a cassette holder mounted for movement in respect to the chassis between an inoperative position spaced from the locating members for permitting the insertion and removal of a cassette in the holder and an operative position where a cassette in the holder is engaged with the locating members, lid opening member mounted for movement in respect to the holder between an inactive position at which the lid opening members are spaced from the holder at its inoperative position in a direction substantially perpendicular to the planes of the spaced walls of a cassette housing in the holder so as to avoid interference with the insertion and removal of the cassette therein, and an active position at which the lid opening members are engageable with the lids of a cassette in the holder at its operative position and are displaced relative to the holder in the direction of movement of the respective lids from their closed positions in their opened positions, and a mechanical coupling connecting the holder and the lid opening members for disposing the latter in their inactive and active positions in response to the movement of the holder to its inoperative an operative positions, respectively.

The above, and other objects, features and advantages of this invention, will be apparent in the following detailed description of an illustrative embodiment which is to be read in connection with the accompanying drawings.

DETAILED DESCRIPTION OF A PREFERRED EMBODIMENT

Figure 1:
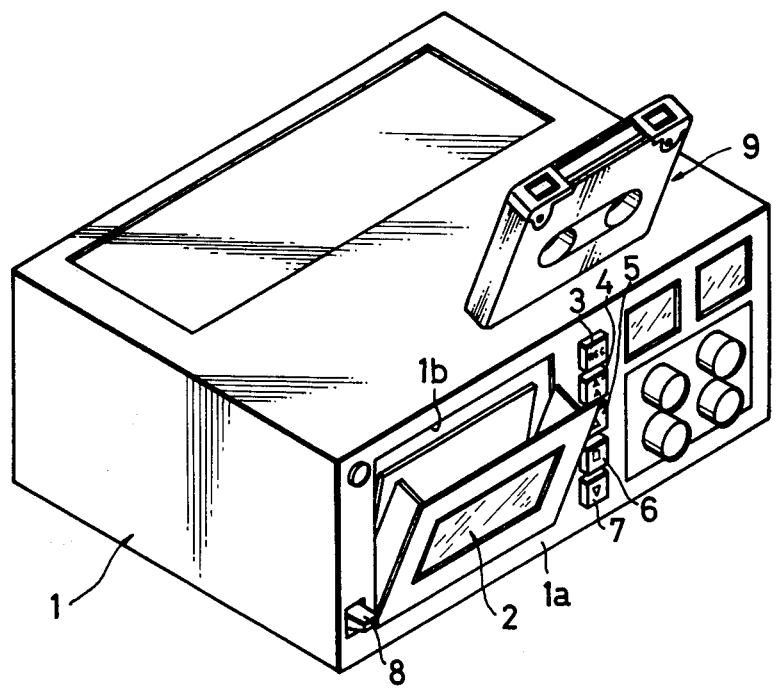
FIG. 1 is a perspective view of a tape recording and/or reproducing apparatus provided with a cassette loading device according to this invention.

Referring to the drawings in detail, and initially to FIG. 1 thereof, it will be seen that a tape recording and/or reproducing apparatus embodying this invention may employ a tape deck of the so-called "component type", and may generally comprise a cabinet 1 having a front panel 1a, a cassette holder 2 which is movable through an opening 1b in front panel 1a, a vertically arranged grouping of pushbuttons 3,4,5,6 and 7 projecting from front panel 1a and being selectively actuable for establishing the recording, fast-forward,reproducing,stop and rewind modes of operation of the apparatus, and an ejecting knob 8 also projecting from front panel 1a for returning cassette holder 2 from an operative position to a forwardly tilted inoperative position, as shown, at which a tape cassette 9 can be conveniently inserted in, or removed from the cassette holder. As further shown, additional control knobs, meters and a pilot lamp may be arranged on front panel 1a, as in a conventional tape recording and/or reproducing apparatus.

Figure 2:
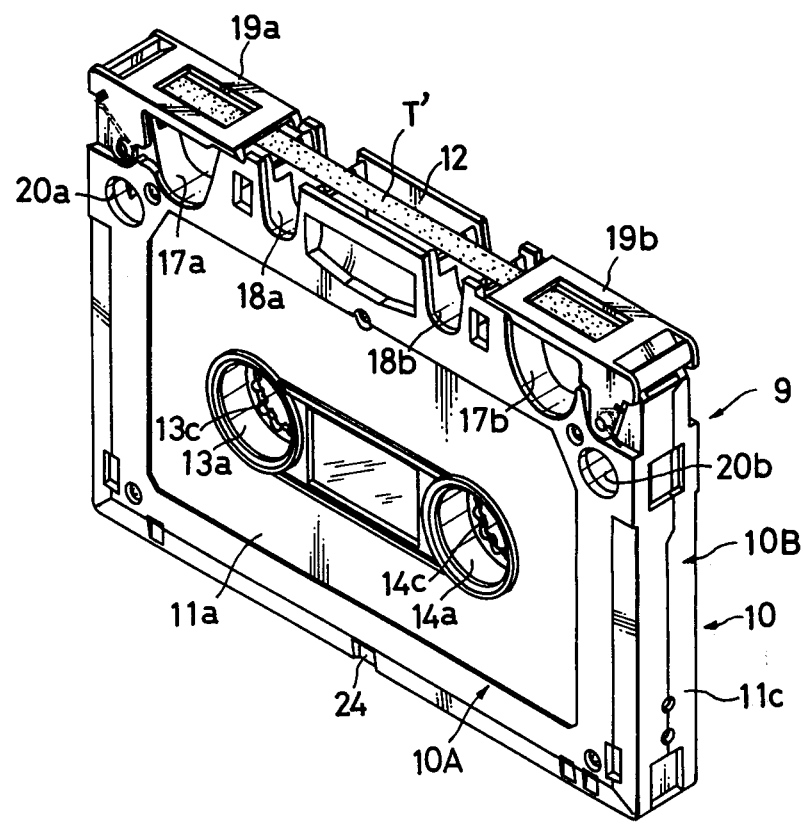
FIG. 2 is a perspective view of a tape cassette of the type which is intended for use in the tape recording and/or reproducing apparatus according to this invention.
Figure 3:
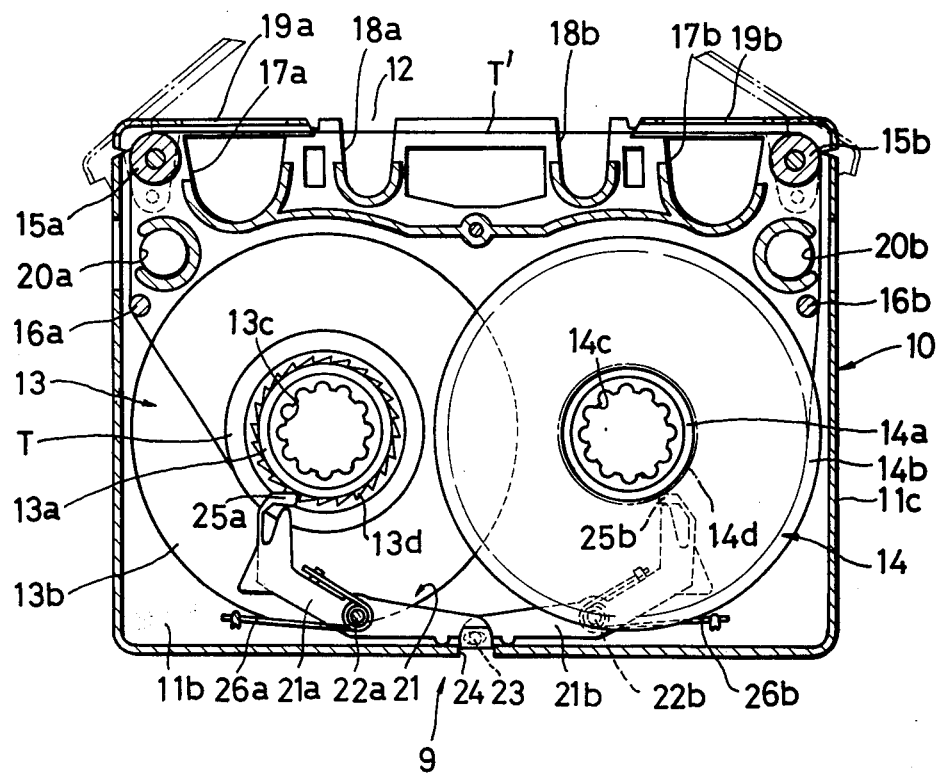
FIG. 3 is a top plan view of the tape cassette of FIG. 2, but which is shown with the upper half of its housing removed.

Referring now to FIGS. 2 and 3, it will be seen that tape cassette 9 for use in the recording and/or reproducing apparatus according to this invention generally comprises a substantially rectangular cassette housing 10 which is substantially larger than the housing of a normal compact tape cassette, and which is formed of suitably secured together, mating molded plastic sections 10A and 10B providing spaced, parallel walls 11a and 11b and a peripheral wall 11c. It will be apparent that the peripheral wall 11c extends along only three of the sides of rectangular housing 10 so that an opening 12 is defined between walls 11a and 11b along the forth relatively long side of the housing. A supply of tape T which is wider than the magnetic tape of a normal compact cassette is contained in housing 10 and is wound on supply and take-up reels 13 and 14 (FIG. 3). As shown, supply reel 13 may include a cylindrical hub 13a which, at its opposite ends, is loosely and rotatably guided in circular holes provided in walls 11a and 11b of housing 10, and a single flange 13b which extends radially outward from hub 13a adjacent wall 11b. The inner surface of hub 13a is formed with a plurality of circumferentially spaced apart projections or splines 13c for rotatably coupling of supply reel 13 with a respective reel mounting member or drive shaft of the tape recording and/or reproducing apparatus, as hereinafter described in detail. The take-up reel 14 may similarly include a cylindrical hub 14a which, at its upper and lower ends, is loosely and rotatably guided in circular holes in walls 11a and 11b, and a single flange 14b extending radially outward from hub 14a adjacent wall 11a. The inner surface of hub 14a is also shown to be formed with a plurality of circumferentially spaced projections or splines 14c for rotatable coupling of take-up reel 14 with a respective reel mounting member or drive shaft of the tape recording and/or reproducing apparatus. As shown, reels 13 and 14 are disposed in side-by-side relation with the flange 13b of reel 13 overlapping or overlying a portion of the flange 14b of reel 14, and with the tape T wound on reels 13 and 14 being guided between the flanges 13b and 14b of such reels and respective inner surface portions of walls 11a and 11b which may be covered with layers of low friction material.

The cassette 9 is also shown to be provided with guide rollers 15a and 15b (FIG. 3) which are rotatably mounted on pins extending between walls 11a and 11b at the corners of housing 10 which are at the opposite ends of opening 12 for guiding tape T between reels 13 and 14 in a run T' extending along the open long side of the cassette housing. Furhter, guide pins 16a and 16b extend between walls 11a and 11b adjacent the opposite, relatively short sides of rectangular housing 10 and engage the tape between reel 13 and guide roller 15a and between reel 14 and guide roller 15b, respectively.

Further, walls 11a and 11b of housing 10 are provided with pairs of aligned, generally U-shaped cutouts 17a and 17b which communicate with opening 12, and which are symmetrically disposed adjacent the opposite ends of the respective long side of the housing. Additional pairs of aligned, relatively smaller generally U-shaped cutouts 18a and 18b which also communicate with opening 12 are provided in walls 11a and 11b at symmetrical positions spaced inwardly from cutouts 17a and 17b, respectively. The tape cassette 9 for use in the recording and/or reproducing apparatus according to this invention is also shown to be provided with lid members 19a and 19b which are mounted to pivot relative to housing 10 about respective pivot axes disposed adjacent the corners of rectangular housing 10 which are at opposite ends of the long open side of the lhousing, and which are spring-biased to their closed positions shown on FIG. 2 and further shown in full lines on FIG. 3. The pivot axes of lid members 19a and 19b are perpendicular to the planes of walls 11a and 11b for permitting swinging movements of the lid members in directions parallel to the planes of such walls 11a and 11b between the mentioned closed positions at which lid members 19a and 19b extend along at least part of the open long side of the housing or covering or protecting at least respective parts of the tape in run T', and opened positions, as shown in broken lines on FIG. 3, in which lid members 19a with 19b are displaced from opening 12 for permitting the withdrawal of the tape through such opening, as hereinafter described in detail. Preferably, as shown, lid members 19a and 19b are dimensioned to at least extend across cutouts 17a and 17b, respectively, when the lid members are in their closed positions.

Walls 11a and 11b of cassette housing 10 are also preferably provided with pairs of aligned holes 20a and 20b located adjacent the opposite relatively short sides of the rectangular housing at positions that are relatively near to the open long side of the housing for receiving locating members, as hereinafter described in detail, by which the cassette housing may be accurately located at an operative position thereof within the tape recording and/or reproducing apparatus.

Figure 4:
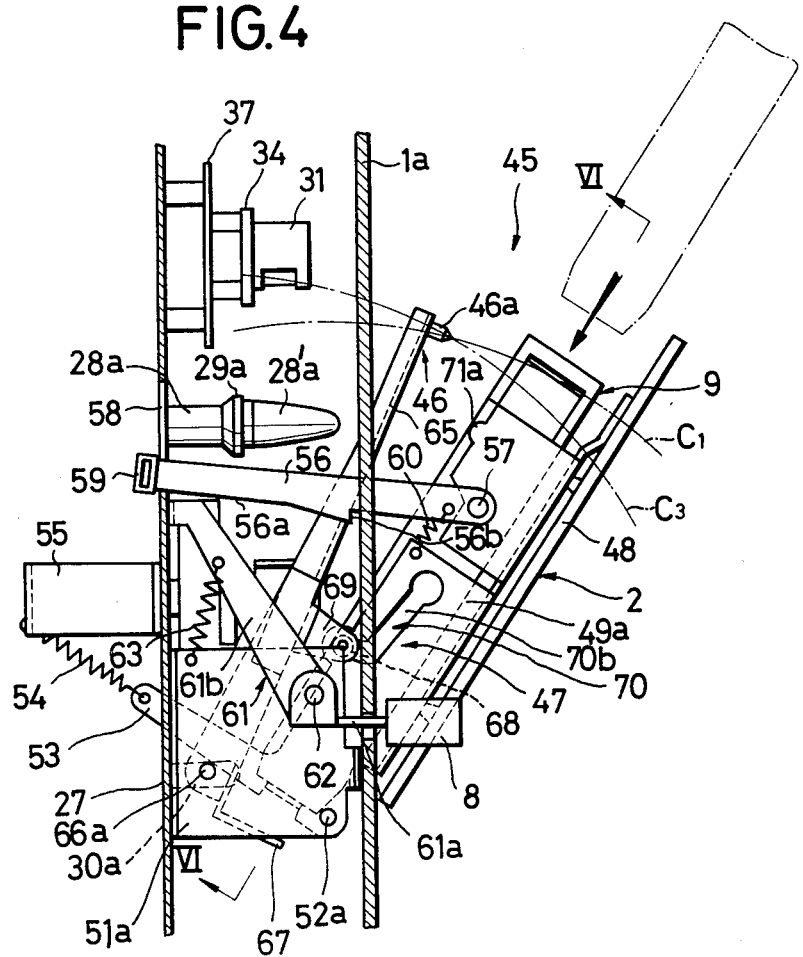
FIG. 4 is a side elevational view of an embodiment of a cassette loading device according to this invention which is shown with its cassette holder in an inoperative or cassette receiving position thereof.
Figure 5:
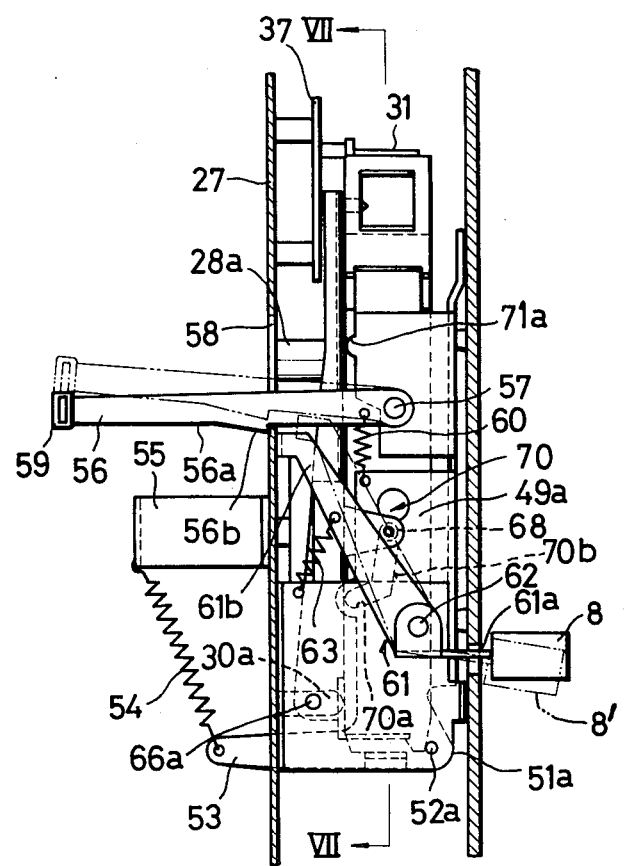
FIG. 5 is a view similar to that of FIG. 4, but with the cassette holder being shown in an operative position.

Finally, the tape cassette 9 is shown to be provided with a brake assembly 21 (FIG. 3) which is engaged when the cassette is not is use for holding reels 13 and 14 against rotation particularly in the directions for unwinding the tape T therefrom, and which is releasable, as hereinafter described in detail, for permitting free rotati on of reels 13 and 14 within cassette housing 10, as during recording and reproducing operations. In the illustrated cassette 9, the brake assembly 21 is shown to comprise levers 21a and 21b which, intermediate their ends, are respectively pivoted on pins 22a and 22b which are laterally spaced apart within housing 10 adjacent the long side of the latter remote from opening 12. The laterally inner ends of levers 21a and 21b are in adjacent, superposed relation and coupled together, for examle, as by a pin and slot connection indicated in broken lines at 23, and such coupled-together inner ends of levers 21a and 21b are exposed at an aperture or window which is substantially centrally located in the adjacent side of the cassette housing. Hooks or pawl-like members 25a and 25b are provided on flexibly resilient extensions of the laterally outer ends of levers 21a and 21b, respectively, and are engageable with serrated gears 13d and 14d which are formed on adjacent end portions of hubs 13a and 14a, respectively. Torsion springs 26a and 26b act on levers 21a and 21b, respectively, so as to urge such levers in the directions for engaging the respective pawl-like members 25a and 25b with the serrated gears 13d and 14d, and for disposing the coupled-together inner ends of levers 21a and 21b against peripheral wall 11c of the cassette housing at the window or aperture 24 therein. Thus, it will be apparent that inward displacement of the coupled-together inner ends of levers 21a and 21b away from peripheral wall 11c at window 24 will be effective to release or disengage brake assembly 21, that is, to move pawl-like members 25a and 25b away from the respective serrated gears 13d and 14d. Referring now to FIGS. 4 and 5, it will be seen that, in the illustrating tape recording and/or reproducing apparatus according to this invention for use with the above described tape cassette 9, a chassis plate 27 is disposed within the cabinet of the apparatus in substantially parallel spaced relation to the front panel 1a of such cabinet. A pair of laterally spaced apart cassette locating posts 28a and 28b extend forwardly from chassis plate 27 and have tapered free end portions 28'a and 28'b which extend from radial shoulders 29a and 29b, respectively. Further, laterally spaced apart locating pins 30a and 30b (FIGS. 7, 8 and 9) are directed forwardly from chassis plate 27 at positions displaced downwardly and inwardly from posts 28a and 28b and terminate substantially at the plane of the shoulders 29a and 29b. The locating posts 28a and 28b and locating pins 30a and 30b are positioned so that, when a tape cassette 9 is moved inwardly through opening 1b of front panel 1a of the cabinet, as hereinafter described in detail, tapering end portions 28'a and 28'b of the locating posts enter holes 20a and 20b, respectively, of the cassette housing for locating the latter in directions parallel to the plane of chassis plate 27, while shoulders 29a and 29b and locating pins 30a and 30b are engageable with either the wall 11a or 11b or the cassette housing for disposing the latter substantially parallel to chassis plate 27 and at a predetermined distance from the latter.

Figure 7:
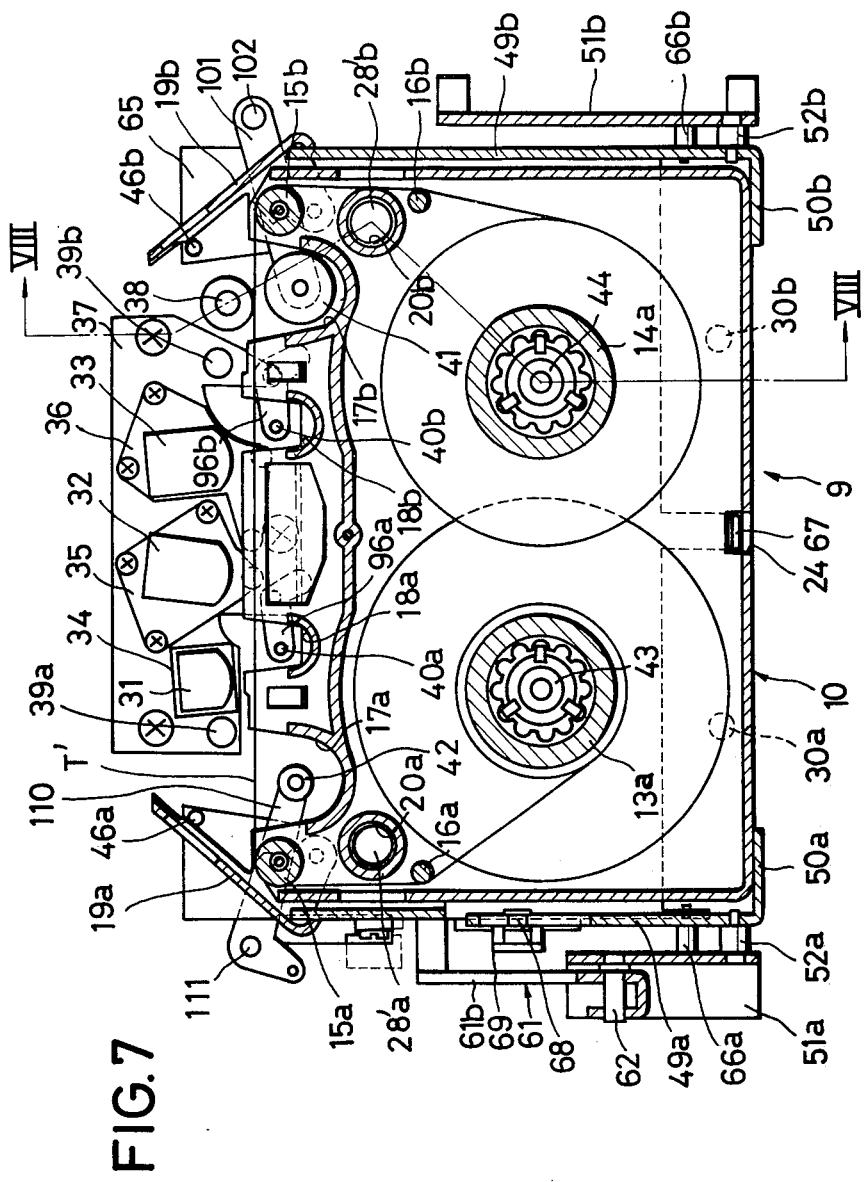
FIG. 7 is a transverse sectional view taken along the line VII—VII on FIG. 5.

An erasing head 31, a recording head 32 and a reproducing head 33 are respectively mounted on head adjusting plates 34,35 and 36 which are, in turn, mounted on a head supporting plate 37 fixedly secured to chassis plate 27 at a level substantially above locating posts 28a and 28b so that, when a tape cassette 9 is operatively positioned by locating posts 28a and 28b and locating pins 30a and 30b with the opening 12 of the cassette housing facing upwardly, heads 31,32 and 33 will be spaced upwardly from run T' of the tape extending along such opening (FIG. 7). A suitably rotated tape drive capstan 38 extends from chassis plate 27 at one side of head mounting plate 37, and tape guides 39a and 39b project forwardly from head mounting plate 37 at positions that are laterally outward with respect to heads 31 and 33. Capstan 38 and tape guide pins 39a and 39b are also disposed in the vertical direction, as viewed on the drawings, so as to be spaced upwardly from the upper or open side of cassette housing 10 when the latter is operatively positioned by locating posts 28a and 28b and locating pins 30a and 30b.

The tape recording and/or reproducing apparatus according to this invention is further shown to have a pair of tape withdrawing or shifting members 40a and 40b, a pinch roller 41 and a tension detecting roller 42 which are normally disposed, as hereinafter described in detail and as shown on FIGS. 7 and 12, so as to extend forwardly into cutouts 18a and 18b, cutout 17b and cutout 17a, respectively, of cassette housing 10 below tape run T' extending along the open side of the cassette housing when the latter is operatively positioned by locating post 28a and 28b and locating pins 30a and 30b. Further, reel mounting members or spindles 43 and 44 are rotatably supported on chassis plate 27 in front of the latter and are positioned to extend into, and be rotatably coupled with hubs 13a and 14a, respectively, of the supply and takeup reels in the operatively positioned cassette housing.

In accordance with the present invention, a tape recording and/or reproducing apparatus of the type described above is provided with a cassette loading device 45 which generally comprises the previously mentioned cassette holder 2 mounted for movement in respect to the chassis plate 27 between an inoperative or forwardly tilted position (FIGS. 4 and 8) spaced from the locating posts 28a and 28b and locating pins 30a and 30b for the insertion and removal of a cassette 9 in holder 2 and an operative position (FIGS. 5 and 9) where a cassette 9 in holder 2 is moved through opening 1b in front panel 1a and is engaged with such locating posts and locating posts, lid opening means 46 including lid opening pins 46a and 46b mounted for movement in respect to holder 2 between an inactive position (FIGS. 4 and 8) at which the lid opening pins 46a and 46b are spaced from the holder 2 in a direction substantially perpendicular to the planes of walls 11a and 11b of a cassette housing in the holder at the inoperative position of the latter so as to avoid interference with the insertion and removal of the cassette therein, and an active position (FIGS. 5 and 9) at which the lid opening pins 46a and 46b are engageable with the lids 19a and 19b of an operatively positioned cassette in the holder 2 and are displaced relative to such holder in the direction of movement of the respective lids from their closed positions to their opened positions, and mechanical coupling means 47 connecting holder 2 and lid opening means 46 for disposing the latter in its inactive and active positions in response to movement of holder 2 to its inoperative and operative positions, respectively.

In the illustrated embodiment of cassette loading device 45, holder 2 includes a front wall 48 dimensioned to fill opening 1b in front panel 1a, and rearwardly directed flanges at the opposite sides of front wall 48 with inwardly directed cassette retaining tabs 50a and 50b being provided at the lower ends of flanges 49a and 49b, respectively (FIGS. 4–9). Holder 2 is dimensioned so that cassette 9 can be slidably inserted therein from above in back of front wall 48 between flanges 49a and 49b so as to rest, at the bottom, on retaining tabs 50a and 50b. Laterally spaced apart support brackets 51a and 51b are directed forwardly from chassis plate 27 and have pivot pins 52a and 52b fixed therto or pivotal engagement with flanges 49a and 49b, adjacent the lower ends of the latter, whereby to define a pivoting axis for swinging movements of holder 2 between its inoperative or opened position and its operative or closed position. An arm 53 integral with the lower end portion of flange 49a is directed rearwardly therefrom (FIGS. 4 and 5), and a tension spring 54 is connected between the free end of arm 53 and a spring anchor 55 on chassis 27 for urging holder 2 to swing in the clockwise direction, as viewed on FIGS. 4 and 5, about the pivot axis defined by pins 52a and 52b. In order to limit the swinging of holder 2 under the urging of spring 54 to the desired inoperative or opened position of the holder, a limit arm 56 is pivoted at its forward end, as at 57, on the upper portion of flange 49a and extends rearwardly therefrom through a slit 58 in chassis plate 27. A rubber stopper 59 is secured on the back end of arm 56 in back of chassis plate 27 so as to be engageable with the latter (FIG. 4) for limiting the forward tilting of holder 2 at the desired inoperative or opened position of the latter. A tension spring 60 is connected between arm 56 and a suitable anchor on flange 49a below arm 56 so as to urge the latter downwardly and thereby maintain engagement of the lower edge 56a of arm 56 with the lower end of slit 58. Further, a latching nose 56b is directed downwardly from the lower edge 56a of arm 56 so that, when holder 2 is in its closed or operative position (FIGS. 5 and 11) latching nose 56b will engage chassis plate 27 below the lower end of slit 58 and thereby retain the cassette holder in its closed or operative position.

In order to release latching nose 56b from chassis plate 27 and thereby permit return of holder 2 to its opened or inoperative position by the force of spring 54, the ejecting knob 8 is fixed to a forwardly directed lever arm 61a of a two-armed lever 61 which is pivoted on a pin 62 carried by bracket 51a. The other arm 61b of lever 61 is directed upwardly and rearwardly from pivot pin 62 so as to be engageable upwardly against the lower edge 56a of arm 56. A tension spring 63 is connected between lever arm 61b and bracket 51a for urging lever 61 in the counter-clockwise direction, as viewed on FIG. 4, that is, in the direction for disengaging ejecting lever 61 from arm 56. However, it will be apparent that, with holder 2 in its closed or operative position, as shown on FIG. 5, depressing of ejecting button 8, for example, to the position shown in broken lines at 8' on FIG. 5, causes clockwise turning of lever 61 so that its arm 61b acts upwardly against the lower edge of arm 56 for upwardly displacing the latter and thereby disengaging its latching nose 56b from chassis plate 27. Upon such disengagement, spring 54 becomes effective to swing holder 2 to its opened or inoperative position shown on FIG. 4.

It will be apparent that, in the course of the swinging movement of holder 2 from its opened or inoperative position to its closed or operative position, a cassette 9 inserted in holder 2 while in its opened position is carried into engagement with locating posts 28a and 28b and locating pins 30a and 30b so as to be operatively positioned thereby relative to chassis 27. Preferably, as shown, a plurality of leaf springs 64 (FIGS. 8 and 9) are suitably mounted at the back or inner surface of front wall 48 of the cassette holder so that, when holder 2 is in its operative or closed position (FIG. 9) such springs 64 will act against one of the walls 11a, 11b of a cassette 9 in the holder for securely seating the other of the walls 11a and 11b against shoulders 29a and 29b on the locating posts and against the free ends of locating pins 30a and 30b.

In the illustrated cassette loading device 45 according to this invention, the lid opening means 46 is further shown to include a plate 65 disposed in back of holder 2 and having the laterally spaced apart lid opening pins 46a and 46b directed forwardly from upper portions of plate 65. Plate 65 is suitably cut away, for example, as shown in broken lines on FIG. 6, so as to permit locating posts 28a and 28b, locating pins 30a and 30b and reel mounting members 43 and 44 to extend forwardly beyond plate 65 into engagement with a cassette 9 when the latter is operatively positioned. The lower end portion of plate 65 is pivotally mounted on pivot pins 66a and 66b (FIGS. 4 and 8) so that plate 65 is swingable relative to chassis 27 and relative to holder 2 between an inactive position (FIGS. 4 and 8) and an active position (FIGS. 5 and 9). The pivot pins 66a and 66b defining the swinging axis for plate 65 of lid opening means 46 are spaced rearwardly by the distance $l_1$ and upwardly by the distance $l_2$ (FIG. 8) from the pivot pins 52a and 52b defining the pivoting axis for holder 2. Thus, the pivoting axis for plate 65 of lid opening means 46 is displaced from the pivoting axis for holder 2 both in the direction away from the inoperative or opened position of the holder and in the direction toward the transducers or heads 31, 32 and 33 mounted on chassis plate 27. Finally, plate 65 is formed with a brake releasing member or tab 67 which is directed forwardly at the center of the lower edge of plate 65 so as to enter window or aperture 24 of the cassette housing 10 and act against the coupled-together ends of brake lever arms 21a and 21b for releasing the brake assembly 21 when cassette holder 2 is in its operative position and plate 65 is in its active position.

The mechanical coupling means 47 of the illustrated embodiment of the cassette loading device 45 according to this invention is shown to include a cam follower roller 68 rotatably carried by a bracket 69 directed forwardly from one side of plate 65 and being engaged in a cam slot 70 formed in the flange 49a of holder 2. The cam slot 70 (FIGS. 4,5,10 and 11) is shown to include an arcuate lower end portion 70a which is concentric with the pivoting axis of holder 2, and an upper portion 70b which is inclined slightly toward the plane of front wall 48 of holder 2. By reason of the described configuration of cam slot 70, the latter and cam follower roller 68 provide a loss-motion connection between holder 2 and plate 65 of lid opening means 46, that is, during engagement of cam follower roller 68 in arcuate portion 70a of cam slot 70, holder 2 can be pivotally displaced, or example, through the angle $\theta_1$ from its inoperative or fully opened position shown in full lines on FIG. 10 to the position indicated in broken lines without effecting corresponding swinging movement of plate 65, whereas, upon engagement of roller 68 in cam slot portion 70b, additional swinging of holder 2 through the angle $\theta_2$ to its closed or operative position is accompanied by swinging movement of plate 65 from its inactive position (FIG. 10) to its active position (FIG. 11). Further, projections 71a and 71b extend from the rear edges of flanges 49a and 49b of holder 2 so that, when holder 2 is moved from its inoperative position to its closed or operative position, such projections 71a and 71b bear against plate 65 for holding the latter in its active position.

Figure 6:
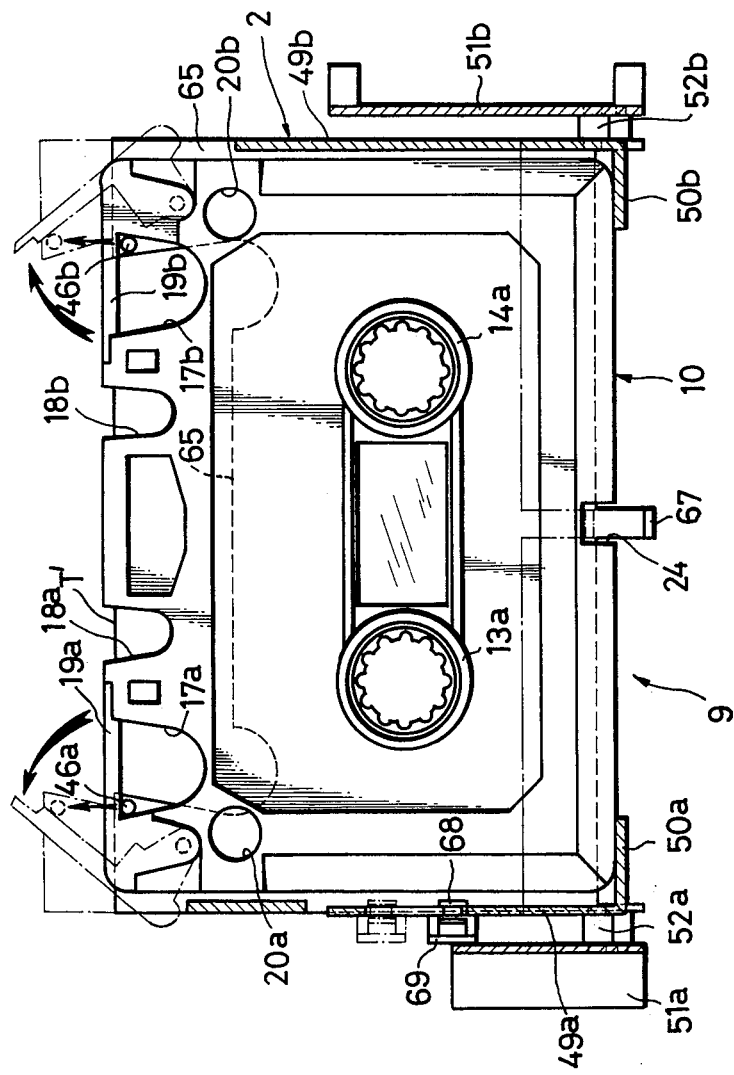
FIG. 6 is a transverse sectional view taken along the line VI—VI on FIG. 4.
Figure 10:
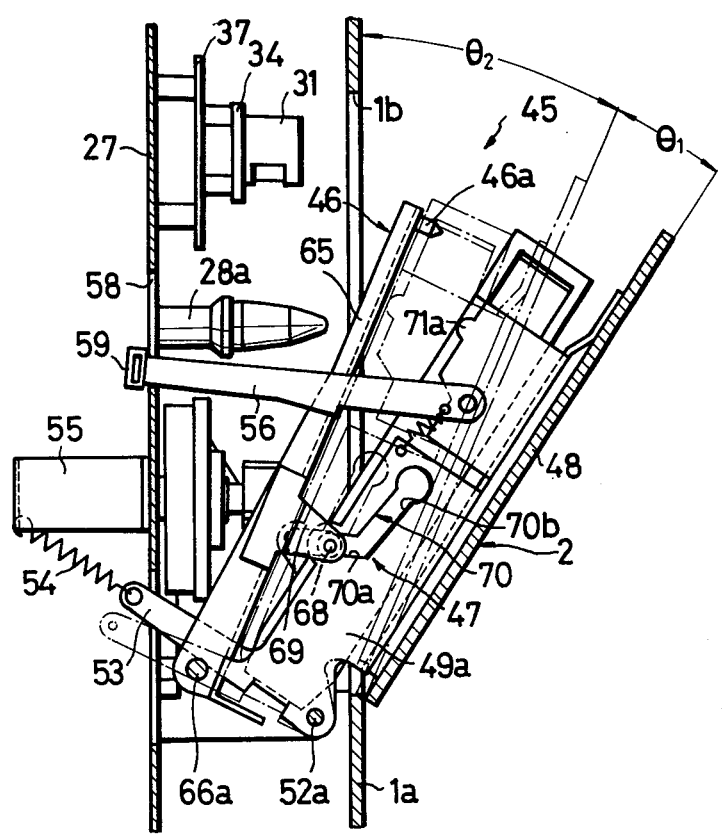
FIGS. 10 and 11 are views of the cassette loading device similar to those of FIGS. 4 and 5, respectively, and to which reference will be made in explaining the cassette loading operation.
Figure 11:
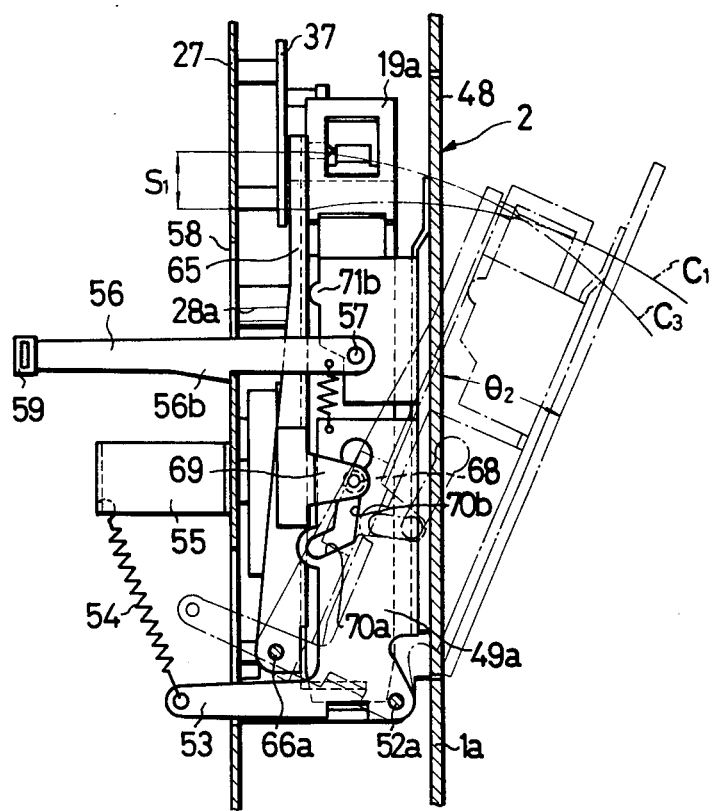

As previously noted, the lid opening pins 46a and 46b are directed forwardly from laterally spaced apart locations on upper portions of plate 65, and such locations are selected so that, when holder 2 with a cassette 9 inserted therein so as to have its lids 19a and 19b uppermost is moved from the inoperative or opened positioned of the holder through the angle $\theta_1$ on FIG. 10 while plate 65 remains in its inactive position, the conical free ends of lid opening pins 46a and 46b will respectively enter cutouts 17a and 17b of the cassette housing and engage under respective lids 19a and 19b, as particularly shown on FIG. 6.

Figure 8:
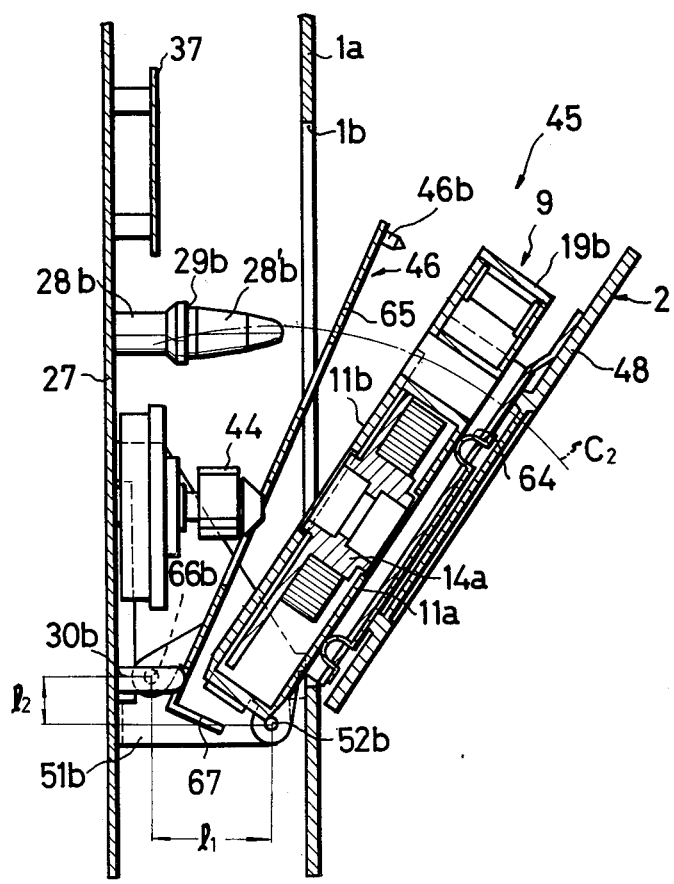
FIG. 8 is a vertical sectional view of the cassette loading device taken along the line VIII—VIII on FIG. 7, but with the cassette holder thereof being shown in its inoperative or cassette receiving position.
Figure 9:
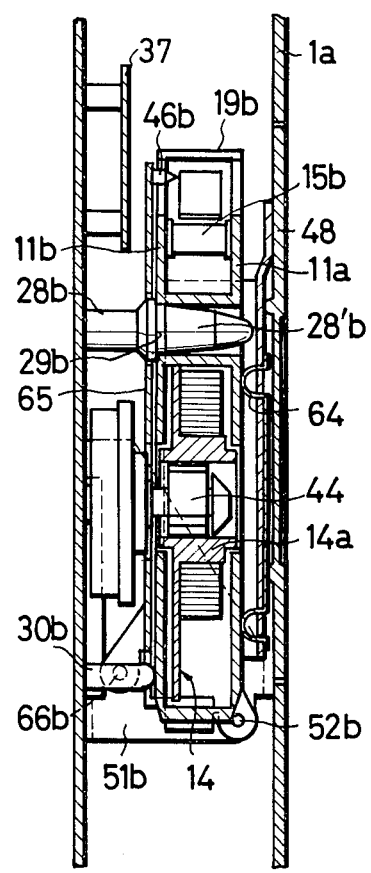
FIG. 9 is a view similar to that of FIG. 8, but showing the cassette holder in its operative position.

The above described cassette loading device 45 operates as follows:

With the tape recording and/or reproducing apparatus in its stop or rest mode so that tape withdrawing of shifting members 40a and 40b, pinch roller 41 and tension detecting roller 42 are all disposed in the positions shown on FIG. 7, and with holder 2 being located in its opened or inoperative position, as shown in FIGS. 4 and 8, a cassette 9 is inserted into the holder from above with the opening 12 and lid members 19a and 19b of the cassette being uppermost while the cassette housing rests on the retaining tabs or members 50a and 50b. With holder 2 in its inoperative position and consequently, plate 65 of the lid opening means 46 being in its inactive position, the brake releasing member 67 on plate 65 is spaced from the cassette housing.

Following the insertion of cassette 9 in holder 2, the latter is manually displaced or swung toward its closed or operative position against the force of spring 54. It will be seen that, during the movement of holder 2 from its inoperative position to its operative position, the rearwardly directed edges of lids 19a and 19b move along an arcuate path $C_1$ (FIGS. 4 and 11) which is concentric with the pivoting axis of holder 2. Similarly, during the movement of holder 2 to its operative position, the centers of holes 20a and 20b in the cassette housing move along a circular path $C_2$ (FIG. 8) which is also concentric with the pivoting axis of holder 2 and which intersects the axes of locating posts 28a and 28b at the shoulders 29a and 20b thereon. On the other hand, lid opening pins 46a and 46b are movable along an arcuate path $C_3$ (FIGS. 4 and 11) which is concentric with the pivoting axis of plate 65, and, by reason of the previously described displacement of the pivoting axis of plate 65 in respect to the pivoting axis of holder 2, the arcuate path $C_1$ of the rear edges of lids 19a and 19b intersects the arcuate path $C_3$ of lid opening pins 46a and 46b at a predetermined point, as shown on FIGS. 4 and 11. More particularly, the arcuate path $C_3$ of lid opening pins 46a and 46b is shown to be inclined upwardly and rearwardly in respect to the arcuate path $C_1$ of the respective lid members 19a and 19b.

As previously mentioned, during the initial swinging movement of holder 2 from its inoperative or fully opened position through the angle $\theta_1$ on FIG. 10, plate 65 remains in its inactive position while cam follower roller 68 moves along cam slot portion 70a. When holder 2 attains the position shown in broken lines on FIG. 10, lid opening pins 46a and 46b enter cutouts 71a and 17b immediately under the respective lids 19a and 19b, and projections 71a and 71b of holder 2 come into engagement with plate 65 while cam follower roller 68 enters cam slot portion 70b. Thereafter, during further swinging movement of holder 2 toward its operative or closed position, the path $C_3$ of lid opening pins 46a and 46b is progressively upwardly displaced in respect to the path $C_1$ with the result that lids 19a and 19b are displaced upwardly or opened, as shown on FIGS. 7, 9 and 11. In other words, during the swinging movement of holder 2 through the angle $\theta_2$ on FIG. 2, lid opening pins 46a and 46b move upwardly in respect to holder 2 through a final distance $S_1$ (FIG. 11) and, during such relative movement, cam follower roller 68 moves upwardly in cam slot portion 70b. Thus, during swinging movement of holder 2 through the angle $\theta_2$, lid members 19a and 19b are progressively opened as the cassette 9 is moved to its operative position. By reason of such progressive opening of the lid members, the latter are fully opened when the cassette attains its operative position, and the heads 31, 32, 33, and capstan 38 of the tape recording and/or reproducing apparatus do not interfere with the opening movement of the lids. It will further be apparent that, during the swinging movement of holder 2 through the angle $\theta_2$, the tapered end portions 28'a and 28'b of locating posts 28a and 28b smoothly enter the holes 20a and 20b, respectively, of the cassette housing, while the reel mounting members 43 and 44 are smoothly engaged with the hubs 13a and 14a of the supply and take-up reels 13 and 14.

When holder 2 attains its fully closed or operative position, in which case, plate 65 has been moved to its active position, latching nose 56b on arm 56 engages in back of chassis plate 27 so as to lock or retain holder 2 and plate 65 in their operative and active positions, respectively. With holder 2 in its operative position, the cassette 9 therein is pressed against shoulders 29a and 29b on the locating posts 28a and 28b and against the ends of locating pins 30a and 30b by the springs 64 (FIG. 9) so that the cassette is thereby accurately located in respect to the heads 31, 32 and 33 and the other components of the recording and/or reproducing apparatus. With plate 65 in its active position, the brake releasing member 67 thereon enters aperture 24 of the operatively positioned cassette housing so as to release the brake assembly 21 of the cassette and thereby permit rotation of the reels 13 and 14. It will further be seen that, upon the completion of a loading operation of the cassette loading device 45, tape withdrawing members 40a and 40b are inserted in cutouts 18a and 18b while tension detecting roller 42 and pinch roller 41 are inserted in cutouts 17a and 17b below tape run T', whereas the heads 31, 32 and 33, the tape guides 39a and 39b and the capstan 38 are all suitably disposed above tape run T' which is fully exposed by reason by the opening of lids 19a and 19b.

When ejecting knob 8 is manually depressed, ejecting lever 61 moves arm 56 upwardly for releasing its latching nose 56b from chassis plate 27 and thereby permitting spring 54 to swing holder 2 toward its opened or inoperative position. By reason of the engagement of cam follower roller 68 in cam slot portion 70b, during the swinging of holder 2 through the angle $\theta_2$ in the direction away from its closed or operative position, the plate 65 is also pivotally displaced from its active position to its inactive position and, in the course of such swinging or pivotal movement of plate 65, pins 46a and 46b are moved downwardly relative to the cassette in holder 2 so as to permit the spring-urged closing of lids 19a and 19b. Further, the brake releasing member 67 on plate 65 is removed from aperture 24 of the cassette housing during the swinging of holder 2 through the angle $\theta_2$ so that, the brake assembly 21 of the cassette is again engaged. Finally, the holder 2 is urged by spring 54 to swing through the additional angle $\theta_1$ to its fully opened or inoperative position while plate 65 remains in its inactive position due to the engagement of cam follower roller 68 in cam slot portion 70a. Thus, when holder 2 again strains its fully opened or inoperative position, pins 46a and 46b of the lid opening means 46 are relatively widely spaced from the cassette, as shown in full lines on FIG. 10, so as to avoid any interference with the upward removal of the cassette from holder 2.

Referring now to FIGS. 12-16, it will be seen that, in a tape recording and/or reproducing apparatus having a cassette holding device 45 according to this invention, the push-buttons 3-7 for selectively establishing the various modes of operation of the apparatus are movably mounted in a common frame 72 which is suitably fixed to chassis plate 27. The push-buttons 3,4,5,6 and 7 are respectively pivotally connected to L-shaped operating levers 73,74,75,76 and 77 which are all pivoted on a common support shaft 78 (FIG. 16) which is mounted in frame 72. Each of the operating levers 73-77 is urged by a respective torsion spring 79 in the counter-clockwise direction, as viewed on FIG. 16, so as to cause the respective push-button to project through a corresponding opening in front panel 1a of the cabinet. As is well known, the operating levers 73-77 are associated with a conventional misoperation preventing slide and locking member (not shown) so that only the push-button 5 for selecting the reproducing mode of operation and the push-button 3 for selecting the recording mode of operation can be simultaneously depressed, and further so that each of the push-buttons 3,4,5 and 7, upon bein depressed, will be retained in its depressed position for maintaining the respective selected mode of operation until the push-button 6 is depressed for restoring the stop or rest mode of the apparatus.

Figure 16:
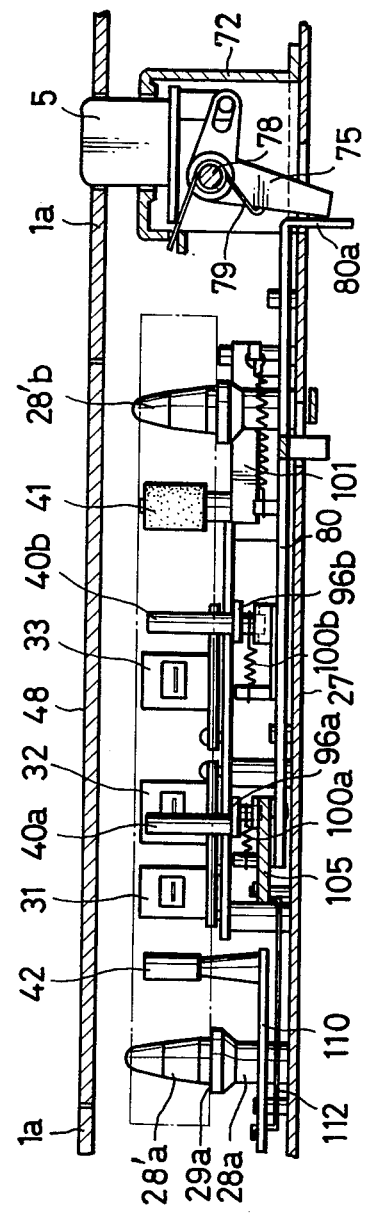
FIG. 16 is a sectional view of the tape drive and brake assemblies as viewed along the line XVI—XVI on FIG. 13.

A reproducing slide member 80 is provided with elongated slots 81a and 81b which slidably receive mounting pins 82a and 82b extending from chassis plate 27, and by which slide member 80 is mounted for lateral movement relative to chassis plate 27 above reel mounting members 43 and 44. Slide member 80 is urged toward the right, as viewed on FIG. 12, by means of a spring 83 connected between member 80 and a suitable anchor on chassis plate 27, whereby to engage a bent end portion 80a of slide member 80 with the operating lever 75 (FIG. 16). A rewind slide member 84 is substantially horizontally arranged below reel mounting members 43 and 44 and is formed with elongated slots 85a and 85b which slidably receive locating pins 30a and 30b so as to mount slide member 84 for lateral movement in respect to chassis plate 27. A spring 86 is connected between slide member 84 and a suitable anchor on chassis plate 27 for urging slide member 84 toward the right, as viewed on FIG. 12, thereby to engage a bent end portion 84a of slide member 84 with operating lever 77. A brake operating slide member 87 is horizontally arranged against the back surface of chassis plate 27 intermediate the levels of slide members 80 and 84 and is formed with spaced elongated slots 88a and 88b which slidably receive mounting pins 89a and 89b projecting rearwardly from chassis plate 27 so as to mount slide member 87 for lateral movement in respect to the chassis plate. A fast forward lever 90 is pivotally mounted on a pivot pin 91 which is supported by chassis plate 27 adjacent push-button frame 72, and an arm of lever 90 has a bent end portion 90a which is disposed adjacent operating lever 74 and which is urged into engagement with the latter by a spring 92 suitably connected to lever 90 for urging the latter in the clockwise direction, as viewed on FIG. 12. A see-saw or two-armed lever 93 is pivotally mounted, intermediate its ends, on a pivot pin 94 carried by the right-hand end portion of slide member 87, and such lever 93 is formed with projections 93a, 93b and 93c which are located for engagement with the bent end portion 90a of lever 90, the bent end portion 80a of slide member 80 and the bent end portion 84a of slide member 84, respectively, when slide member 87 is urged toward the right, as viewed on FIG. 12, by means of a spring 95 connected between slide member 87 and a suitable anchor on chassis plate 27. As hereinafter described in detail, the lever 93 acts as a mechanical transmission means for selectively displacing the brake operating slide member 87 against the force of spring 95 in response to the displacement of any one of the slide members 80 and 84 or the lever 90. Further, the reproducing slide member 80, the rewind slide member 84 and the fast-forward lever 90 are suitably interlocked or connected with a conventional idler change-over mechanism (not shown) for suitably driving the reel mounting members 43 and 44 upon selection of the reproducing or recording modes of operation, the rewind mode of operation or the fast-forward mode of operation, respectively.

As shown, the tape withdrawing or shifting members 40a and 40b project forwardly from end portions of bent support levers 96a and 96b which are mounted pivotally, intermediate their ends, on pivot pins 97a and 97b on the head mounting plate 37. The ends of levers 96a and 96b remote from tape withdrawing members 40a and 40b carry guide pins 98a and 98b which slidably engage in vertical slots formed in actuating members 99a and 99b fixed on reproducing slide member 80. Springs 100a and 100b are suitably connected with levers 96a and 96b for urging the latter in the clockwise direction and thereby retaining guide pins 98a and 98b in engagement with the respective actuating members 99a and 99b. Pinch roller 41 is shown to be rotatably supported at one end of a bellcrank 101 which is pivotally mounted intermediate its ends, as at 102, on chassis plate 27, and which is urged to turn in the clockwise direction, as viewed on FIG. 12, by means of a tension spring 103 for maintaining engagement of the end of lever 101 remote from pinch roller 41 with an actuating pin 104 carried by slide member 80.

It will be apparent that, with reproducing slide member 80 in its rest position, as shown on FIG. 12, tape withdrawing members 40a and 40b and pinch roller 41 are disposed to enter the respective cutouts 18a, 18b and 17b of a cassette housing moved to it operative position and to be disposed below the tape run T', as shown on FIG. 7. However, the push-button 5 is depressed for selecting the reproducing mode of operation, the consequent rocking of its associated operating lever 75 causes displacement of slide member 80 toward the left to the actuated position shown on FIG. 13. Such displacement of slide member 80 causes actuating members 99a and 99b to turn levers 96a and 96b in the clockwise direction with the result that tape withdrawing members 40a and 40b move upwardly out of the respective cutouts 18a and 18b of the operatively positioned cassette housing for withdrawing the tape from the latter and moving the withdrawn tape into engagement with the heads 31,32 and 33 thereabove. Further, the displacement of slide member 82 to its actuated position, permits spring 103 to turn lever 101 in the clockwise direction, with the result that pinch roller 41 on lever 101 moves upwardly in cutout 17b of the operatively positioned cassette housing and thereby presses the tape run T' against rotated capstan 38.

In order to control the tension in the tape during a reproducing or recording operation, a tension brake lever 105 is pivotally mounted, as at 106, on chassis plate 27 adjacent the mounting member 43 for supply reel 13, and carries a brake shoe 107 which is engageable against a brake drum surface 108 on mouning member 43. A tension spring 109 is connected between brake lever 105 and mounting pin 82a for urging brake lever 105 in the clockwise direction and thereby pressing shoe 107 against drum surface 108. The tension detecting roller 42 is shown to be mounted at one end of a support lever 110 which is pivoted, as at 111, on chasis plate 27, and which has its opposite end connected by a link or rod 112 to brake lever 105. Brake lever 105 is furthr shown to carry a cam follower pin 113 which is engageable with a cam surface 114 formed in slide member 80. Such cam surface 114 is shown to be inclined in respect to the direction of movement of slide member 80 so that, when slide member 80 is in its rest position (FIG. 12) the engagement of cam follower pin 113 with cam surface 114 causes counter-clockwise turning of brake lever 105 against the force of spring 109 and thereby displaces brake shoe 107 away from drum surface 108 on supply reel mounting member 43. The counter-clockwise turning of brake lever 105 is further effective, through the connecting link or rod 112, to effect clockwise turning of lever 110 to the position shown on FIG. 12 where tension detecting roller 42 is positioned for insertion in the respective cutout 17a of a cassette housing below the tape run T'. However, when slide member 80 is displaced to its actuated position (FIG. 13) for selecting a reproducing or recording mode of operation, cam follower pin 113 rides downwardly along cam surface 114 to permit spring 109 to turn brake lever 105 in the clockwise direction for applying brake shoe 107 against brake drum surface 108. The clockwise turning of brake lever 105 is transmitted through link or rod 112 to lever 110 for turning the latter in the counter-clockwise direction and thereby moving tension detecting roller 42 upwardly out of cutout 17a and into engagement with tape run T' between guide roller 15a in the cassette housing and guide pin 39a on tape mounting plate 37. It will be apparent that an increased tension in the tape while being driven by capstan 38 and pinch roller 41 will cause a downward movement of tension detecting roller 42, for example, from the position shown in full lines to the position shown in broken lines on FIG. 13, and that such movement of roller 42 will cause a corresponding angular displacement of brake lever 105 in the counter-clockwise direction for decreasing the braking force exerted by brake shoe 107 on drum surface 108, whereby to reduce the resistance to turning of the supply reel 13 for lowering the tension in the tape. Conversely, a decrease in the tape tension detected by roller 42 will cause spring 109 to effect upward movement of roller 42, and such upward movement of the tension detecting roller will be accompanied by angular displacement of lever 105 in the clockwise direction for increasing the braking force of shoe 107 against drum surface 108, and thereby increasing the tension of the tape. Thus, the tension in the tape is maintained substantially constant without regard to the diameters of the tape wound on reels 13 and 14 so that signals can be recorded on the tape, or reproduced therefrom with improved fidelity. The foregoing characteristic of the tension regulating mechanism described above is to be contrasted with those so-called constant tension arrangements in which a constant brake force is applied to the supply reel mounting member, with the result that the tension in the tape between the tape drive capstan and the supply reel will vary in accordance with changes in the diameter of the turns of tape wound on the supply reel.

The illustrated tape recording and/or reproducing apparatus according to an embodiment of this invention is further shown to comprise stop brake assemblies 115 and 116 associated with reel mounting members 43 and 44, respectively. The stop brake assembly 115 is shown to include a primary support member 117 pivotally mounted, as at 118, on the chassis plate 27 and carrying a pivot pin 119 on which an auxiliary support member 120 is supported, and a brake shoe 121 which is pivotally mounted, as at 122, on auxiliary support member 120. A spring 123 is connected between primary support member 117 and a suitable anchor on chassis plate 127 for urging primary support member 117 in the counter-clockwise direction about the respective pivot 118, as viewed on FIG. 12, while a spring 124 is connected between the primary support member 117 and the auxiliary support member 120 for urging the latter in the clockwise direction about pivot pin 119 relative to primary support member 117. Preferably, the spring constant of spring 124 is larger than the spring constant of spring 123 for a purpose hereinafter described in detail.

A foot 120a is provided on auxiliary support member 120 to engage primary support member 117 and thereby limit the turning of support member 120 relative to support member 117 under the urging of spring 124. It will be apparent that, by reason of spring 123, brake shoe 121 is normally applied against drum surface 108 of supply reel mounting member 43 for holding the latter against rotation. In order to release stop brake assembly 115, an actuating projection 125 is formed on the left-hand end portion of brake control slide member 87 and is engageable with primary support member 117. Thus, when slide member 87 is displaced toward the left, as hereinafter described, from its rest position shown on FIG. 12, actuating member 125 acts against primary support member 117 for turning the latter in the clockwise direction and thereby spacing brake shoe 121 from drum surface 108.

The stop brake assembly 116 is generally similar to assembly 115 and is shown to include a primary support member 126 pivotally supported, as at 127, on chassis plate 27 and carrying a pivot pin 128 on which an auxiliary support member 129 is pivotally mounted. A brake shoe 130 is pivoted, as at 131, on auxiliary support member 129 and is engageable with a drum surface 133 on take-up reel mounting member 44. A spring 134 is connected between primary support member 126 and an anchor on chassis plate 27 for urging primary support member 126 in the clockwise direction and thereby applying brake shoe 130 against drum surface 133, while a spring 135 having a spring constant greater than that of spring 134 is connected between primary support member 126 and auxiliary support member 129 for urging the latter in the counter-clockwise direction relative to support member 26 to an extent limited by a foot 129a provided on support member 129 and engageable with support member 126. It will be seen that, when brake control slide member 87 is in its rest position (FIG. 12) brake shoe 130 engages drum surface 133 for holding take-up reel mounting member 44 against rotation. In order to release stop brake assembly 116, primary support member 126 thereof has an extension 126a directed upwardly from pivot pin 127 and being selectively engageable by an actuating shoulder 136 formed on slide member 80 or by an actuating projection 137 on brake control slide member 87, as hereinafter described in detail.

Figure 12:
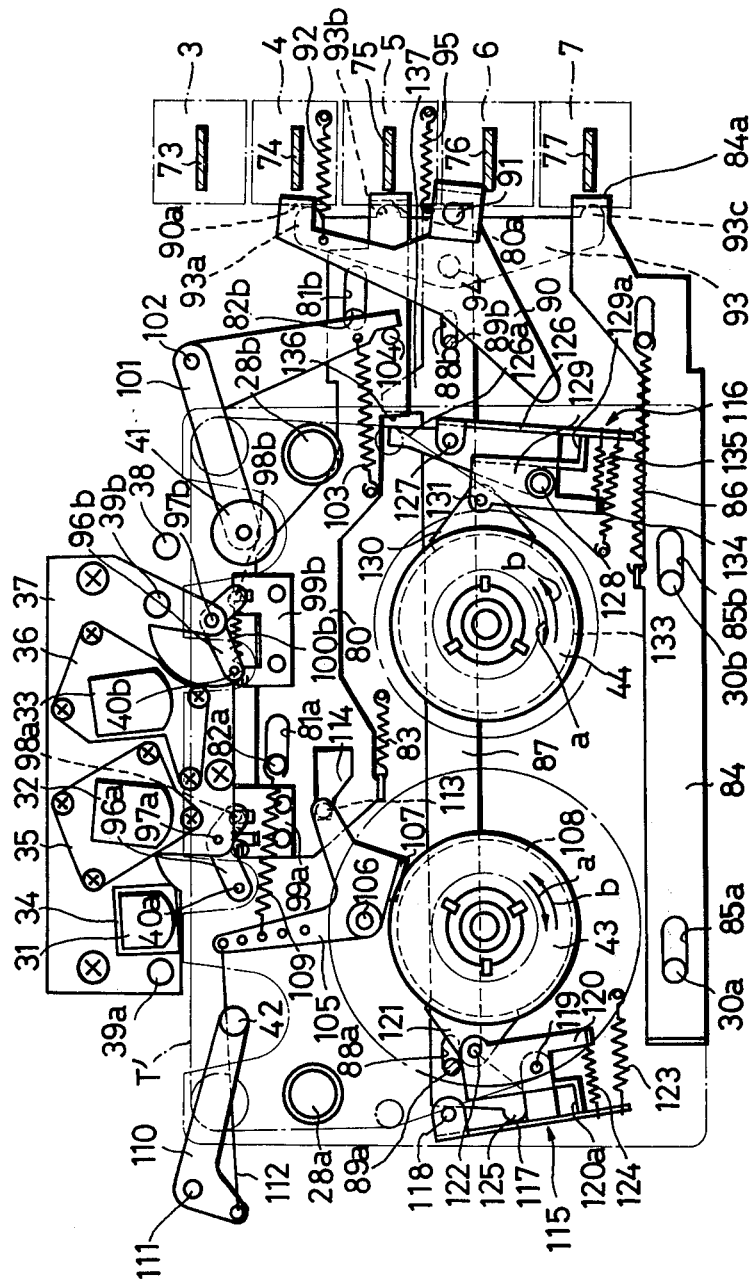
FIG. 12 is a front elevational view of a tape drive and brake assembly which may be employed in association with the cassette loading device according to this invention, an which are shown in the stop or rest mode of the recording and/or reproducing apparatus.

With a cassette 9 disposed in its operative position by means of cassette loading device 45 according to this invention, the mode change-over operations of the described tape recording and/or reproducing apparatus are as follows:

In the stop or rest mode, as shown in FIG. 12, the tension detecting roller 42, pinch roller 41 and tape withdrawing members 40a and 40b are disposed in cutouts 17a, 17b, 18a and 18b, respectively, below the run T' of the tape exposed at the upwardly facing opening 12 of the cassette housing. The brake shoes 121 and 130 are pressed against the circumferential drum surface 108 and 133 of reel mounting members 43 and 44 for holding the latter against rotation. By reason of the fact that the springs 124 and 135 have larger spring constants than the springs 123 and 134, respectively, the reel mounting members 43 and 44 are more strongly braked against rotation in the directions of the arrows a on FIG. 12 than in the direction of the arrows b so that so-called "limiter brake effect" is obtained.

Figure 13:
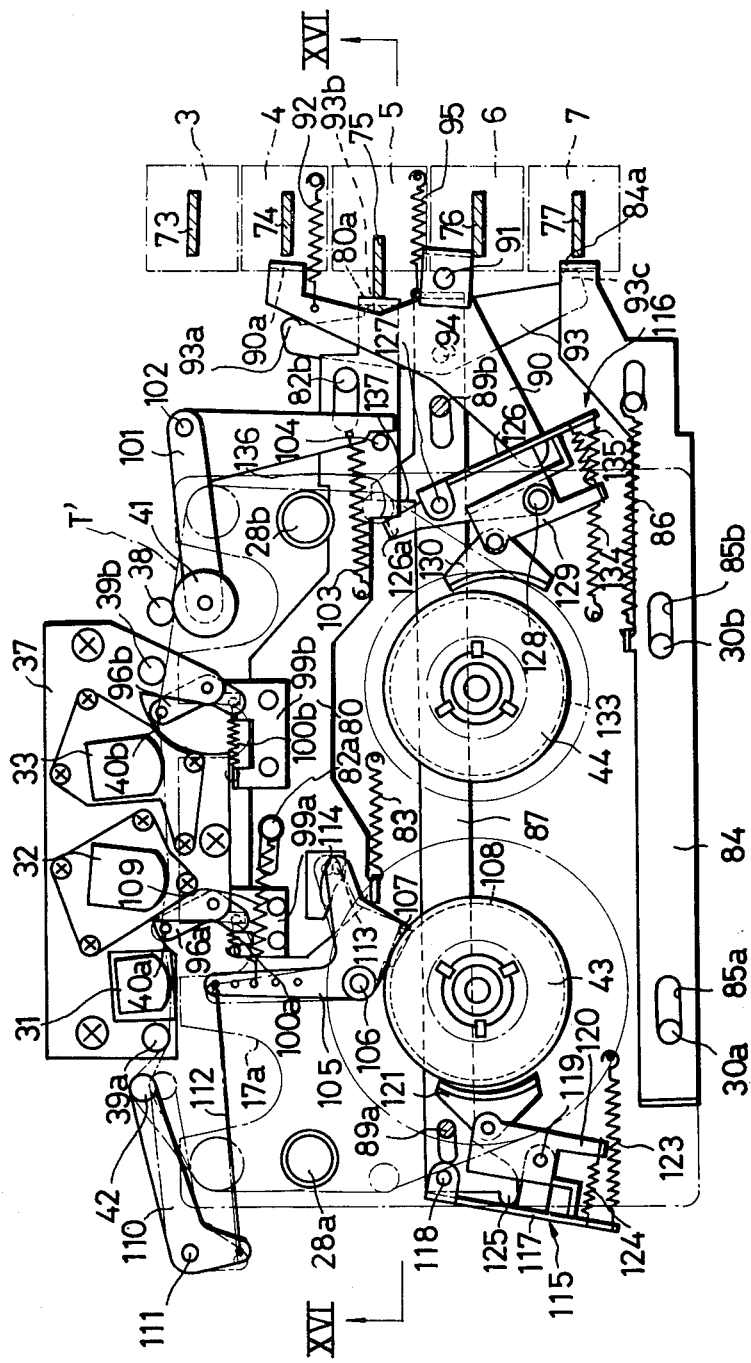
FIGS. 13, 14 and 15 are views similar to that of FIG. 12, but illustrating the reproduce or record, the fast-forward and the rewind modes of operation, respectively.

When it is desired to change-over the apparatus to its reproducing mode of operation, push-button 5 is depressed so as to displace the respective operating lever 75, as shown on FIGS. 13 and 16. Such displacement of operating lever 75 causes movement of the respective slide member 80 to its actuated position, with the result that tape withdrawing members 40a and 40b are raised to withdraw the run T' of the tape from the cassette housing and into engagement with heads 31, 32 and 33, while pinch roller 41 is raised to engage the tape with drive capstan 38 and tension brake lever 105 is turned by spring 109 to engage its brake shoe 107 with drum surface 108 and to raise tension detecting roller 42 into engagement with tape run T' for regulating the tension in the tape as it is driven by capstan 38, as previously described herein.

Furthermore, the movement of slide member 80 to its actuated position causes the bent end portion 80a of the slide member to act against projection 93b on lever 93 for turning the latter in the counter-clockwise direction about a fulcrum defined by the contact of projection 93c with the bent end portion 84a of slide member 84. Due to the connection of lever 93 to slide member 87 at pivot pin 94, the counter-clockwise turning of lever 93 causes leftward displacement of slide member 87 from its rest position, with the result that brake actuating member 125 on slide member 87 causes turning of primary support member 117 of stop brake assembly 115 for spacing the respective brake shoe 121 from drum surface 108 on reel mounting member 43. Since the radial distance from projection 93b to projection 93c on lever 93 is greater than the radial distance from pivot pin 94 to projectin 93c, the displacement of brake control slide member 87 from its rest position that results from the movement of slide member 80 to its actuated position is smaller than the displacement of slide member 80 from its rest position to its actuated position. Therefore, upon displacement of slide member 80 to its actuated position for establishing the reproducing mode of operation, the brake actuating portion 136 on slide member 80 moves further toward the left than the brake actuating projection 137 on slide member 87 and, acts against extension 126a of the primary support member 126 of stop brake assembly 116 for causing a relatively large anuglar displacement of support member 126 in the counter-clockwise direction, thereby to relatively widely space the associated brake shoe 130 from the drum surface 133 on reel mounting member 44. In other words, upon selection of the reproducing mode of operation, brake shoes 121 and 130 are released from the respective reel mounting members 43 and 44 so as to free such reel mounting members for rotation. Moreover, it will be apparent from the above description that the brake shoe 130 is spaced from the respective drum surface 133 by a distance greater than the spacing of brake shoe 121 from the respective drum surface 180.

Upon the completion of the change-over to the reproducing mode of operation by movement of slide member 80 to its actuated position, the tape is driven at a predetermined speed by capstan 38 in cooperation with pinch roller 41 in the direction from supply reel 13 coupled with reel mounting member 43 to take-up reel 14 coupled with reel mounting member 44 which is suitably driven in a conventional manner so as to take up the tape on reel 14. During such driving of the tape, the tension regulating mechanism constituted by detecting roller 42 and tension brake lever 105 is effective to maintain a constant tension in the tape as previously described, and head 33 is made operative to reproduce audio or other signals previously recorded on the tape.

When it is desired to effect change-over of the apparatus to its recording mode of operation, push-button 3 is depressed simultaneously with push-button 5, in which case, slide member 80 is displaced from its rest position to its actuated position for achieving all of the results described above in connection with the change-over to the reproducing mode of operation, while the reproducing circuits associated with head 33 remain inoperative and the recording circuits associated with heads 31 and 32 are made operative to cause head 31 to erase information signals previously recorded on the tape and head 32 to act, thereafter, for recording the new audio or information signals on the tape.

When it is desired to halt a reproducing or recording operation of the apparatus, the push-button 6 is depressed for establishing the stop or rest mode. In response to depressing of push-button 6, the conventional locking mechanism (not shown) is released to permit return of operating lever 75 and push-button 5 (and also of push-button 3 in the case where the recording mode of operation has been previously selected) to their original positions. Thereupon, slide members 80 and 87 are returned by springs 83 and 95, respectively, to their rest positions shown on FIG. 12. In the course of the return movement of slide member 80 to its rest position, cam surface 114 thereon acts against cam follower pin 113 on tension brake lever 105 for turning the latter so as to space the respective brake shoe 107 from drum surface 108, and further to turn lever 110 in the direction for moving tension detecting roller 42 downwardly into the respective cutout 17a of the cassette housing. Further, the return movement of slide member 80 to its rest position causes actuating members 99a and 99b thereon to effect downward movements of tape withdrawing members 40a and 40b into the respective cutouts 18a and 18b of the housing, while the pin 104 on slide member 80 acts against lever 101 for moving pinch roller 41 downwardly away from capstan 38 into cutout 17b of the cassette housing. Thus, the driving of the tape by capstan 38 in cooperation with pinch roller 41 is halted.

Further, in response to the return movements of slide members 80 and 87 to their rest positions, springs 123 and 134 are effective to turn the respective primary support members 117 and 126 in the directions for reengaging brake shoes 121 and 130 with drum surfaces 108 and 133, respectively, on reel mounting members 43 and 44. However, since brake shoes 121 and 130 are relatively widely spaced from drum surfaces 108 and 133, respectively, for the reproducing or recording mode of operation, the tape withdrawing members 40a and 40b, the pinch roller 41 and the tension detecting roller 42 are all moved downwardly into the respective cutouts of the cassette housing by return movement of slide member 80 toward its rest position prior to the reengagement of brake shoes 121 and 130 with drum surfaces 108 and 133, respectively. Accordingly, the slack created in the tape by the downward movement of tape withdrawing members 40a and 40b, pinch roller 41 and tension detecting roller 42 is taken up by the continued rotation of reel mounting member 44 coupled to the take-up reel 14. Moreover, since the spacing of brake shoe 130 from the respective drum surface 133 is greater than the spacing of brake shoe 121 from the associated drum surface 108 in the reproducing or recording mode of operation, it will be seen that, upon depressing of push-button 6 for selecting the stop mode, the brake shoe 121 is pressed against drum surface 108 prior to the movement of brake shoe 130 against drum surface 133. By reason of the foregoing, the tape drawn back into the cassette housing is tensioned between the supply and take-up reels 13 and 14 in response to the final rotation of the take-up reel.

Figure 14:
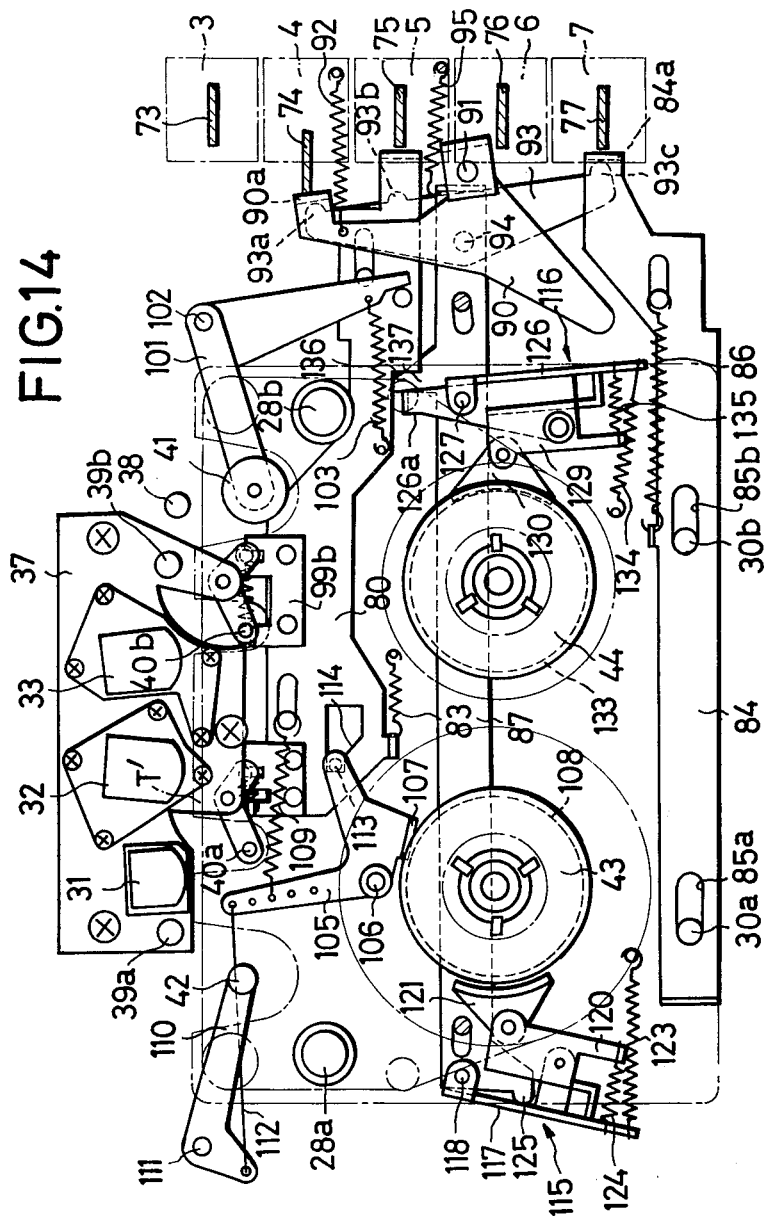

Referring now to FIG. 14, it will be seen that, when push-button 4 is depressed to select the fast-forward mode of operation of the apparatus, the respective operating lever 74 is displaced to cause turning of lever 90 in the counter-clockwise direction about pivot 91. In response to such turning of lever 90, the bent end portion 90a thereof acts against projection 93a on lever 93 for turning the latter in the counter-clockwise direction about the fulcrum defined by the engagement of projection 93c with the bent end portion 84a on slide member 84. Such angular displacement of lever 93 causes pivot 94 thereof to displace slide member 87 in the leftward direction from its rest position. However, since the radial distance from projection 93a to projection 93c is almost twice the radial distance from pivot 94 to projection 93c, the displacement of slide member 87 from its rest position for the fast-forward mode of operation is substantially smaller than the displacement of slide member 87 from its rest position for the reproducing or recording mode of operation. Therefore, the relatively small displacement of slide member 87 from its rest position causes actuating projections 125 and 137 on slide member 87 to effect relatively small angular displacements of the respective primary support members 117 and 126 in the directions for spacing brake shoes 121 and 130 by relatively small distances from the respective drum surfaces 108 and 133. Thus, the reel mounting members 43 and 44 coupled with the supply and take-up reels are free to be rotated when, in response to the previously described turning of lever 90, the conventional reel drive mechanism (not shown) of the apparatus is made operative to effect the relative high speed rotation of reel mounting member 44 in the direction for the fast-forward or high speed transfer of tape from the supply reel to the take-up reel. Since slide member 80 remains in its rest position in the fast-forward mode of operation, tape withdrawing members 40a and 40b, pinch roller 41 and tension detecting roller 42 remain in their lowered positions, as shown on FIG. 14, while lids 19a and 19b of the cassette remain in their opened positions, as shown in FIG. 7, so as to avoid any contact with the tape in run T' while the tape is being advanced a high speed in the fast-forward mode of operation.

Upon the depressing or actuation of push-button 6 for halting the fast-forward operation of the apparatus, push-button 4 is released for return of such push-button and the associated operating lever 74 to their original positions, whereupon spring 92 is effective to return lever 90 to its rest position. In response to the return of lever 90 to its rest position for terminating the fast-forward operation, spring 95 is effective to return slide member 87 to its rest position so that springs 123 and 134 can act on the respective primary support members 117 and 126 for engaging brake shoes 121 and 130 with drum surfaces 108 and 133, respectively. Since the brake shoes 121 ad 130 are spaced by only relatively small distances from the respective drum surfaces 108 and 133 during the fast-forward operation, it is apparent that the reengagement of brake shoes 121 and 130 with surfaces 108 and 133 is relatively rapidly achieved upon depressing push-button 6 for terminating the fast-forward operation. Accordingly, the rotation of supply and take-up reels 13 and 14 is rapidly stopped upon the termination of the fast-forward operation so that a desired portion of the tape can be more easily positioned in the opening 12 of the cassette housing.

Figure 15:
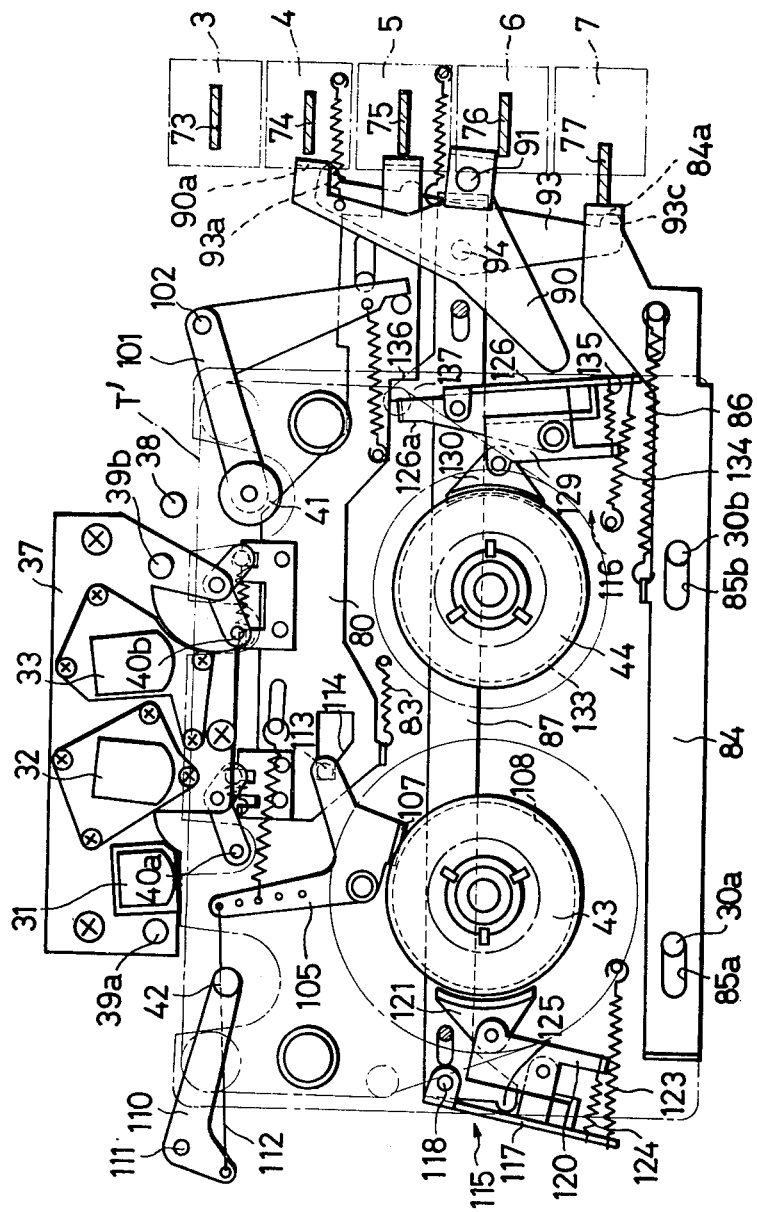

Referring now to FIG. 15, it will be seen that, when push-button 7 is depressed for establishing the rewind mode of operation of the apparatus, the corresponding displacement of its operating lever 77 causes leftward movement of slide member 84 from its rest position to its actuated position. In response to the movement of slide member 84 to its actuated position, bent end portion 84a of such slide member acts on projection 93c of lever 93 for angularly displacing the latter in the clockwise directions against a fulcrum defined by the engagement of projection 93a with bent end portion 90a of lever 90. Such angular displacement of lever 93 is transmitted through pivot pin 94 to slide member 87 for causing leftward displacement of the latter from its rest position. Since pivot 94 is located approximately midway between projections 93a and 93c, the displacement of slide member 87 from its rest position for the rewind mode of operation is approximately equal to the relatively small displacement of slide member 87 from its rest position for the fast-forward mode of operation. Accordingly, in response to the displacement of slide member 87 for the rewind mode of operation, brake shoes 121 and 130 are spaced from the respective drum surfaces 108 and 133 by approximately the same small distances as in the case of the fast-forward mode of operation. The displacement of slide member 84 to its actuated position is of course effective to change-over the conventional reel drive mechanism (not shown) so as to effect the relatively high speed rotation of reel mounting member 43 coupled to the supply reel in the direction for the fast-rewinding of the tape from the take-up reel onto the supply reel. It will be apparent that, in the rewind mode of operation, tape withdrawing members 40a and 40b, pinch roller 41 and tension detecting roller 42 remain in their lowered positions within respective cutouts of the cassette housing, while lips 19a and 19b of the cassette remain in their opened positions so as to avoid any frictional resistance to the high speed rewinding movement of the tape along the run T'.

When push-button 6 is depressed to halt a rewind operation of the apparatus, the release of push-button 7 and the associated actuating lever 77 for return to their original positions permits spring 86 to restore slide member 84 to its rest position. In response to such restoration of slide member 84 to its rest position, the driving of reel mounting member 43 is halted, and brake shoes 121 and 130 are rapidly restored to engagement with drum surfaces 108 and 133, as in the case of the halting of a fast-forward operation, so that a desired portion of the tape can be easily positioned at the opening 12 of the cassette housing.

Although an illustrative embodiment of this invention has been described in detail herein with reference to the accompanying drawings, it is to be understood that the invention is not limited to the precise embodiment, and that various changes and modifications may be effected therein by one skilled in the art without departing from the scope or spirit of the invention as defined in the appended claims.

What is claimed is:

1. A tape recording and/or reproducing apparatus for use with a tape cassette including a housing containing a supply of tape and having spaced parallel walls with an opening therebetween at one side of the housing along which a run of the tape is normally guided, and at least one lid mounted on the housing for movement relative to the latter parallel to the planes of said spaced walls between a closed position where the lid extends along the opening for covering a respective part of said run of the tape and an opened position where the lid is displaced from said opening in the direction away from said one side of the housing to permit the withdrawal of the tape through said opening: said apparatus comprising a chassis; transducer means mounted on said chassic for recording and/or reproducing information signals on a tape engaged therewith; locating means on said chassis engageable with the cassette housing for disposing the latter with said one side thereof facing toward and spaced from said transducer means; tape withdrawing means engageable with said tape run in a cassette housing engaged with said locating means and being operative to withdraw th tape through said opening and into engagement with said transducer means; and a cassette loading device including a cassette holder, means mounting said holder for movement in respect to said chassis between an inoperative position spaced from said locating means for the insertion and removal of a cassette is said holder and an operative position where a cassette in said holder is engaged with said locating means, lid opening means mounted for movement in respect to said holder between an inactive position at which said lid opening means is spaced from said holder in a direction substantially perpendicular to said planes of the walls of a cassette housing in said holder at said inoperative position so as to avoid interference with said insertion and removal of the cassette therein, and an active position at which said lid opening means is engageable with each said lid of a cassette in said holder at said operative position and is displaced relative to said holder in the direction of movement of the respective lid from its closed position to its opened position, and mechanical coupling means connecting said holder and said lid opening means for disposing the latter in said inactive and active positions in response to the movement of said holder to said inoperative and operative positions, respectively.

2. A tape recording and/or reproducing apparatus according to claim 1; further comprising means defining a first pivoting axis fixed relative to said chassis for said movement of the lip opening means in respect to said holder; and in which said means mounting said holder defines a second pivoting axis for said movement of the holder between said inoperative and operative positions with said second axis being fixed relative to said chassis in parallel, spaced relation to said first axis.

3. A tape recording and/or reproducing apparatus according to claim 2; in which said second axis for the movement of said holder is disposed adjacent to the side of a cassette housing in said holder which is remote from said one side having the opening therein, and said first axis is displaced from said second axis both in the directions away from said inoperative position of the holder and in the direction toward said transducer means so that, in moving between said inactive and active positions, said lid opening means move in an arcuate path that intersects an arcuate path in which each said lid of a cassette in said holder moves upon movement of the holder between said inoperative and operative positions, respectively.

4. A tape recording and/or reproducing apparatus according to claim 3; in which said mechanical coupling means includes a lost-motion connection permitting partial movement of said holder from said inoperative position toward said operative position independent of movement of said lid opening means from said inactive position.

5. A tape recording and/or reproducing apparatus according to claim 4; in which said lost-motion connection is constituted by means on said holder defining a cam slot, and cam follower means fixed relative to said lid opening means and slidably engaging in said cam slot, said cam slot having an arcuate end portion concentric with said second pivoting axis for permitting said partial movement of the holder from said inoperative position and further serving to limit the movement of said lid opening means to said inactive position when said cam follower engages said end portion of the cam slot.

6. A tape recording and/or reproducing apparatus according to claim 4; further comprising spring means urging said holder to said inoperative position, and releasable latch means for securing said holder in said operative position.

7. A tape recording and/or reproducing apparatus according to claim 4; in which at least one of said walls of the cassette housing has a cutout for each said lid which communicates with said opening, and each said lid extends across the respective cutout when in said closed position; and in which said lid opening means includes a pin for each said lid which enters the respective cutout in the course of said partial movement of the holder from said inoperative position and which is displaced out of said cutout through said opening for displacing the lid to its opened position in the course of the remaining movement of said holder to said operative position and the consequent movement of said lid opening means from said inactive position to said active position.

8. A tape recording and/or reproducing apparatus according to claim 7; in which said holder includes a front wall, rearwardly directed flanges at the opposite sides of said front wall and being pivoted at their lower ends on said second axis, and cassette retaining means directed inwardly from said lower ends of said flanges, with said front wall being pitched forwardly in said inoperative position of the holder so that the cassette can be inserted downwardly in back of said front wall between said flanges to rest on said retaining means with said one side of the cassette housing being uppermost; and in which said lid opening means further includes a plate pivoted at its lower end on said first axis and having each said pin projecting from its upper end portion toward said front wall of the holder, said plate is angled relative to said front wall of the holder in said inoperative position of the latter for facilitating the insertion of the cassette, and said front wall of the holder and said plate are substantially parallel in said operative position of the holder for embracing a cassette therebetween.

9. A tape recording and/or reproducing apparatus according to claim 8; in which the cassette has two of said lids which are pivoted on the cassette housing adjacent the opposite ends of said one side thereof, and the respective pins for engagement with said two lids are spaced apart on said upper end portion of said plate.

10. A tape recording and/or reproducing apparatus according to claim 8; in which the tape cassette further has rotatable reel means on which the supply of tape is wound, brake means for normally holding said reel means against rotation, and brake releasing means actuable through an aperture in the cassette housing; and in which said cassette loading device further includes an actuator for the brake releasing means fixed on said plate and entering said aperture of the housing upon movment of said lid opening means and said holder to said active and operative positions, respectively, for actuating said brake releasing means.

11. A tape recording and/or reproducing apparatus according to claim 1; in which the tape is wound on supply and take-up reels between which said tape run extends, the cassette housing has pairs of cutouts in said walls communicating with said opening, and said tape withdrawing means extend into respective pairs of said cutouts of a cassette in said holder when the latter is moved to said operative position for engaging the cassette housing with said locating means; and further comprising a rotated capstan mounted on said chassis so as to be adjacent said opening of the cassette housing when the latter engages said locating means, a pinch roller mounted on said chassis for movement between a normal position where said pinch roller is spaced from said capstan and insertable in another pair of said cutouts as the cassette housing is engaged with said locating means and a displaced position where said pinch roller engages said capstan with said tape run therebetween, a slide member movable on said chassis between a rest position and an actuated position for selecting a record and reproduce mode of operation, and means connecting said slide member with said tape withdrawing means to make the latter operative and with said pinch roller to move the latter to said displaced position in response to movement of said slide member to said actuated position.

12. A tape recording and/or reproducing apparatus according to claim 11; further comprising rotatable first and second reel mounting members on said chassis for coupling with said supply and take-up reels, respectively, of a cassette when the housing of the latter is moved into engagement with said locating means; and tape tension control means including tension brake means yieldably urged against said first reel mounting member coupled with the supply reel for resisting the unwinding of the tape therefrom, means on said slide member for holding said tension brake means away from said first reel mounting member in said rest position of said slide member and permitting said tension brake means to engage said first reel mounting member in said actuated position of the slide member, and a tape tension detecting member connected with said tension brake means to extend into another of said pairs of cutouts of the cassette housing when the latter engages said locating means with said slide member in said rest position and to be urged against said run of the tape in correspondence with the yieldable urging of said tension brake means against said first reel mounting member so that the braking force of said tension brake means is regulated in response to changes in the tension in said run of the tape between said capstan and said supply reel.

13. A tape recording and/or reproducing apparatus according to claim 11; further comprising first and second stop brake means yieldably urged against said first and second reel mounting members for halting the rotation thereof, a brake control slide member mounted on said chassis for displacement substantially parallel to the movement of the first mentioned slide member from a rest position, means on said brake control slide member for moving said first and second stop brake means away from said first and second reel mounting members in response to displacement of said brake control slide member from said rest position thereof, a fast-forward control member mounted on said chassis for movement from a rest position to an actuated position for selecting a fast-forward mode of operation of the apparatus, and mechanical transmission means between said first slide member, said brake control slide member and said fast-forward control member to effect selective displacement of said brake control slide member from said rest position through a relatively large distance in response to movement of said first slide member to said actuated position thereof and through a relatively small distance in response to movement of said fast-forward control member to said actuated position of the latter.

14. A tape recording and/or reproducing apparatus according to claim 13; further comprising means on said first slide member engageable with said second stop brake means upon movement of said first slide member to said actuated position thereof for moving said second stop brake means further away from said second reel mounting member than said first stop brake means is moved away from said first reel mounting member by the displacement of said brake control slide member through said relatively large distance.

15. A tape recording and/or reproducing apparatus according to claim 13; further comprising a rewind slide member mounted on said chassis for movement substantially parallel to said brake control slide member from a rest position to an actuated position for selecting a rewind mode of operation of the apparatus; and in which said mechanical transmission means is also engageable by said rewind slide member to displace said brake control slide member through said relatively small distance from said rest position of the latter in response to said movement of the rewind slide member to its actuated position.

16. A tape recording and/or reproducing apparatus according to claim 15; in which said brake control slide member is located between said first slide member and said rewind slide member, said mechanical transmission means includes a two-armed lever pivoted, intermediate its ends, on said brake control slide member and engageable by said first slide member and said rewind slide member, and said fast-forward control member is pivoted on said chassis and acts against said lever upon movement of said fast-forward control member to its actuated position.

* * * * *